United States Patent
Bagchi et al.

(10) Patent No.: US 7,991,430 B2
(45) Date of Patent: *Aug. 2, 2011

(54) CLASSIFIER FOR COMMUNICATION DEVICE

(75) Inventors: Amit G. Bagchi, Mountain View, CA (US); Joseph Paul Lauer, North Reading, MA (US); Srinivasa H. Garlapati, Fremont, CA (US); Rohit V. Gaikwad, San Diego, CA (US); Joonsuk Kim, San Jose, CA (US); Paul Anthony Lettieri, Lake Forest, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/770,628

(22) Filed: Apr. 29, 2010

(65) Prior Publication Data
US 2010/0208715 A1 Aug. 19, 2010

Related U.S. Application Data

(63) Continuation of application No. 10/675,478, filed on Sep. 30, 2003, now Pat. No. 7,715,350.

(60) Provisional application No. 60/478,053, filed on Jun. 12, 2003.

(51) Int. Cl.
*H04M 1/00* (2006.01)

(52) U.S. Cl. .................. 455/552.1; 455/553.1; 455/561; 455/562.1; 370/466; 370/467; 370/468; 370/338

(58) Field of Classification Search .................. 370/466, 370/467, 468, 338, 469; 455/552.1, 561, 455/553.1
See application file for complete search history.

(56) References Cited

U.S. PATENT DOCUMENTS
7,715,350 B2 * 5/2010 Bagchi et al. ................. 370/338
* cited by examiner

*Primary Examiner* — Patrick N Edouard
*Assistant Examiner* — Fred A Casca
(74) *Attorney, Agent, or Firm* — Garlick Harrison & Markison; Shayne X. Short

(57) ABSTRACT

Classifier for communication device. A communication device includes a classifier and a number of PHY (physical layer) receivers communicatively coupled thereto that enable the communication device to process various received signal types. Each of the PHY receivers is operable to perform pre-processing of a received frame (or packet) of data and to calculate a confidence level indicating whether the received frame is intended for that particular PHY receiver; this pre-processing does not involve processing (e.g., demodulation and/or decoding) of the received frame. Those PHY receivers having sufficiently high confidence levels assert claims to the classifier for the received frame. The classifier is operable to arbitrate between competing claims by 2 or more PHY receivers and to ensure that the received frame is provided to the PHY receiver for which it is intended.

20 Claims, 25 Drawing Sheets

WLAN (Wireless Local Area Network) communication system ad hoc WLAN (Wireless Local Area Network) communication system infrastructure / multiple AP (Access Point) WLAN (Wireless Local Area Network) communication system WLAN (Wireless Local Area Network) interactive device having parallel operating PHY (physical layer) receivers WLAN (Wireless Local Area Network) communication system

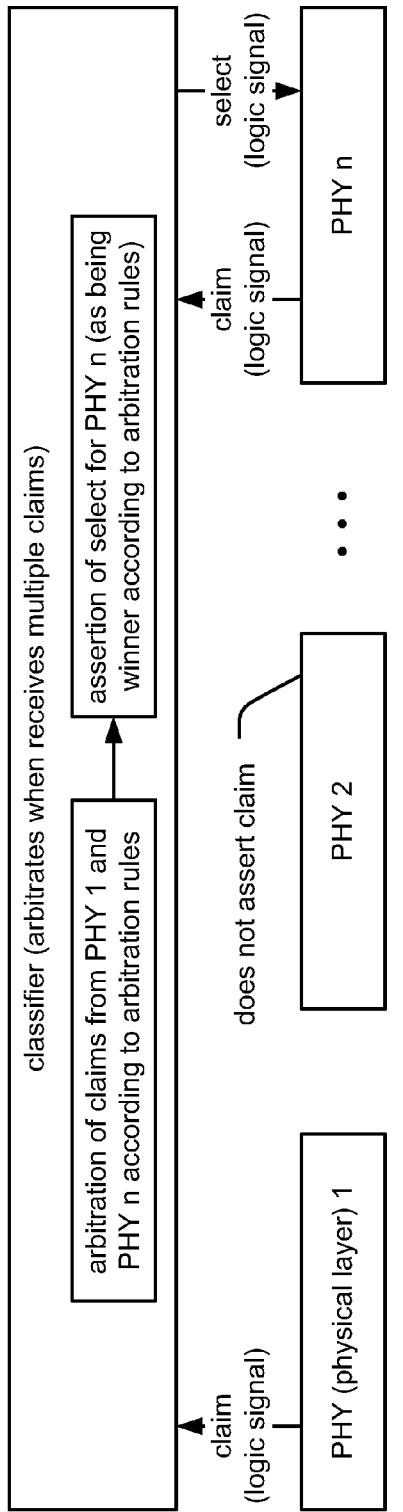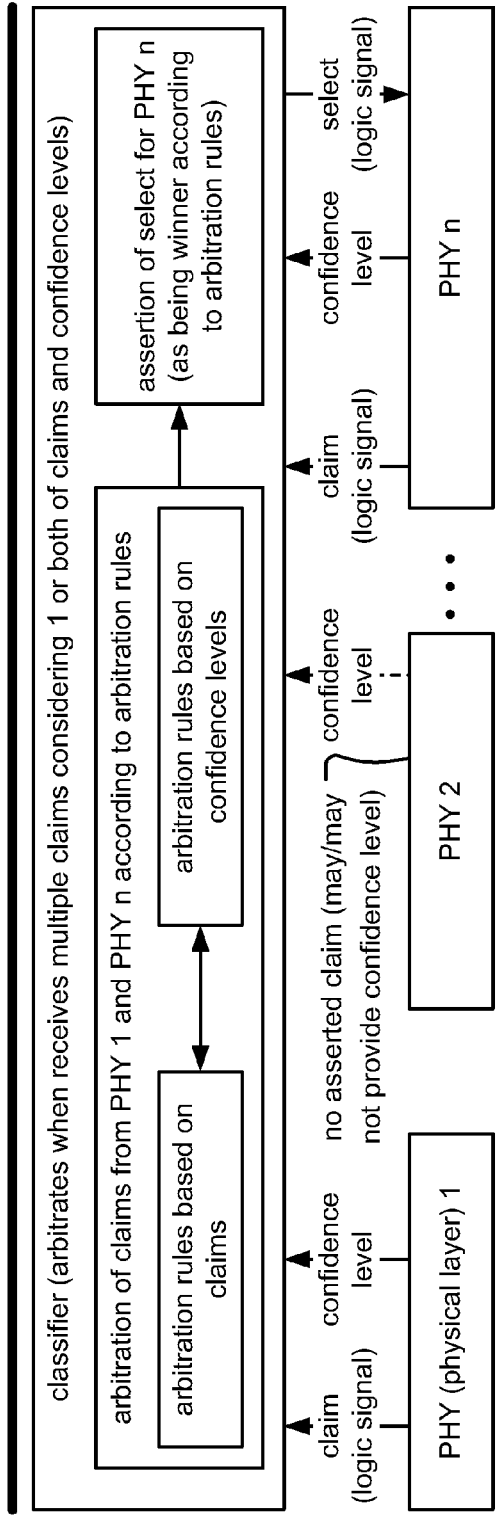

classifier/PHY functionality as a function of steps (shown with respect to intended PHY/classifier interface)

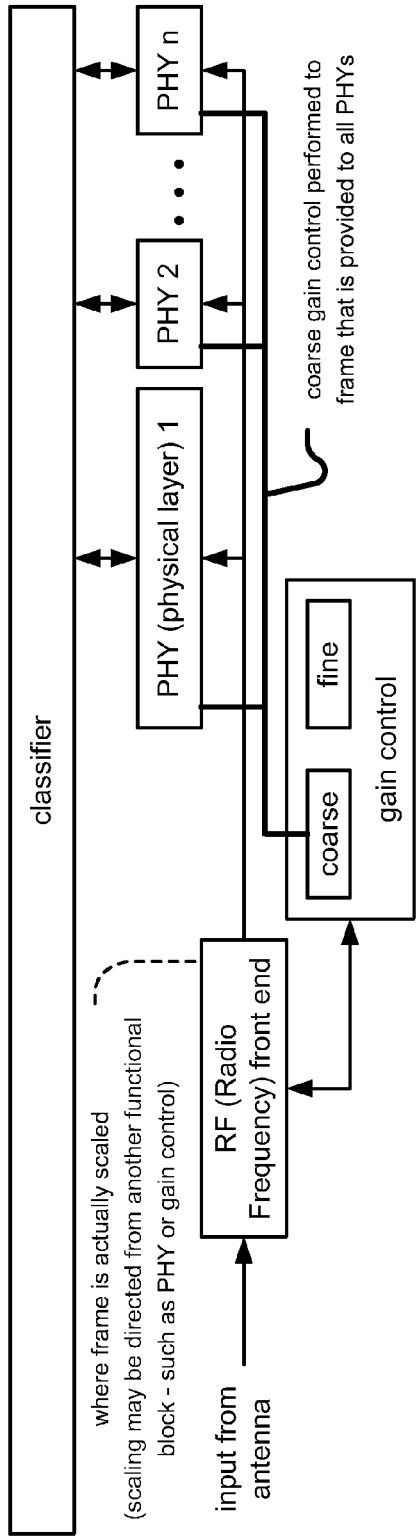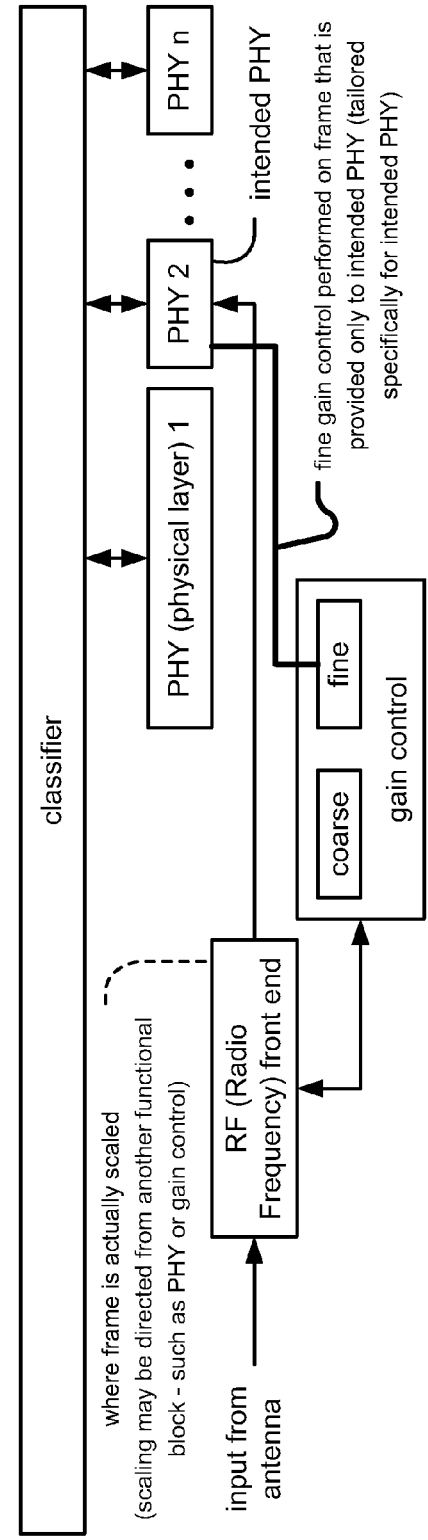

gain control functionality (as controlled individually within respective PHYs)

full functionality set PHY and reduced functionality set PHY implemented within WLAN interactive device classifier state diagram PHY (physical layer)/classifier interface within IEEE 802.11g operable device PHY (physical layer)/classifier interface for IEEE 802.11g operable device Fig. 17 classifier state diagram for IEEE 802.11g operable device PHY (physical layer)/classifier interface interaction as function of time DSSS/CCK and OFDM PHY correlation pre-processing to calculate confidence levels classification method classification method classification method timing diagram for IEEE 802.11g operable device (showing example of good OFDM packet/frame)

CLASSIFIER FOR COMMUNICATION DEVICE

CROSS REFERENCE TO RELATED PATENTS/PATENT APPLICATIONS

Continuation Priority Claim, 35 U.S.C. §120

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 10/675,478, entitled "Classifier for communication device," filed Sep. 30, 2003, pending, and scheduled to be issued as U.S. Pat. No. 7,715,350 on May 11, 2010, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/478,053, entitled "Classifier for IEEE 802.11g receiver," filed Jun. 12, 2003.

BACKGROUND OF THE INVENTION

1. Technical Field of the Invention

The invention relates generally to communication systems; and, more particularly, it relates to the management of signals being transmitted between devices within such communication systems.

2. Description of Related Art

Data communication systems have been under continual development for many years. One typical type of communication systems that has been receiving increased attention over the past several years are those involving Local Area Networks (LANs). One variant of a LAN is a Wireless LAN (WLAN). A WLAN employs wireless communication between the various devices within the communication system. There has been a great deal of energy devoted to developing ways to improve the manner in which devices within WLANs interact with one another. There has been a variety of directions in which this development energy has been directed. For example, some efforts are focused on the seeking to improve the type of signaling used between the various WLAN interactive devices. Other efforts have focused on the development on trying to minimize the complexity of the hardware included within the WLAN interactive devices while maintaining at least a minimum acceptable standard of performance. Some other avenues of development have sought to try to increase the overall throughput of the WLAN; this can be especially of concern when subscribers of the WLAN are seeking to access an external WAN (Wide Are Network) communicatively coupled to the WLAN, and the WLAN itself sometimes undesirably acts as a bottle-neck to those subscribers. In addition, many other areas of development have also received attention in the past years within the WLAN technology space.

More specifically referring to one avenue of development, the IEEE (Institute of Electrical & Electronics Engineers) 802.11 standard has been under continual development in an effort to try to improve the way in which WLANs operate. In this particular effort, there have been a number of amendments to the IEEE 802.11 standard, including the commonly known 802.11b standard and an even newer amendment, namely, the 802.11g standard. The 802.11g standard is backward compatible with the 802.11b standard, so that legacy devices within the WLAN can still interact with the WLAN, although 802.11g operable devices operating within an 802.11b WLAN typically employ a reduced functionality set.

There are typically two manners in which to implement a WLAN: ad hoc (shown in FIG. 1) and infrastructure (shown in FIG. 2).

FIG. 1A is a system diagram illustrating a prior art ad hoc Wireless Local Area Network (WLAN). Referring to FIG. 1A, the ad hoc implementation employs a number of WLAN interactive devices that are typically operable to communicate with each of the other WLAN interactive devices within the WLAN. There is oftentimes no regimented or organized structure to the network. In some instances, one of the WLAN interactive devices is designated as a master of the network and the other WLAN interactive devices operate as slaves with respect to that master.

FIG. 1B is a system diagram illustrating a prior art infrastructure/multiple AP (Access Point) WLAN. Referring now to the FIG. 1B, in the infrastructure (or multiple AP (Access Point)) implementation WLAN, a number of APs are employed to support communication with the WLAN interactive devices (which are sometimes referred to as STAs (wireless stations) in the infrastructure implementation). This infrastructure architecture uses fixed network APs with which the STAs can communicate. These network APs are sometimes connected to landlines (that may be connected to one or more WANs, as described above) to widen the LAN's capability by bridging wireless nodes to other wired nodes. If service areas overlap, handoffs can occur. This infrastructure structure may be implemented in a manner that is analogous to the present day cellular networks around the world.

Considering the development of the 802.11 standard and the subsequent generations and/or versions therein (e.g., 802.11b and 802.11g), there can sometimes be difficulty when various STAs and/or APs within the WLAN support both functionality sets. For example, there may be some instances where an AP or STA is only 802.11b operable. Alternatively, there may be some instances where an AP or STA is 802.11g operable; again, it is noted that the devices supporting the 802.11g functionality set are also typically backward compatible with the 802.11b functionality set. In one instance, when a 802.11g device associates with the WLAN via an 802.11b operable AP, then the full and improved functionality of the 802.11g standard, compared to the 802.11b standard, will not be fully capitalized. Moreover, it has been found that the mixing of 802.11b and 802.11g devices within a single WLAN can severely reduce the overall throughput of the entire WLAN. As briefly mentioned above, this can be extremely problematic when STAs within the WLAN are using the WLAN to access an external WAN, such as the Internet. Even if a user has a fully operable 802.11g device, if that 802.11g user associates with the WLAN via an 802.11b operable AP, then that user will not capitalize fully on the 802.11g functionality of his/her device.

Moreover, the complexity and problems introduced by the mixing of 802.11b and 802.11 g users within a WLAN becomes even more exacerbated given the fact that the 802.11b and 802.11g standards employ two different modulation types. In the 2.4 GHz (Giga-Hertz) bands, there are two standards for modulation to achieve the various data rates. The older standard of the two is 802.11b, and it occupies three channels (of approximately 25 MHz (Mega-Hertz) spread) that are adjacent in the 2.4 GHz band. The 802.11b standard employs DSSS/CCK (Direct Sequence Spread Spectrum with Complementary Code Keying) modulation; in contrast, the 802.11g standard employs OFDM (Orthogonal Frequency Division Multiplexing) modulation. Moreover, the newer 802.11g standard occupies the same band while using the OFDM modulation to achieve data rates approaching 54 Mbps (Mega bits per second). One of the many problems that may arise in this situation is that the 802.11b clients never expect to receive OFDM modulation from the 802.11g users in that particular channel. So if a mixed 802.11b and 802.11g community of users (which may be viewed as a mixed WLAN) starts transmitting in the same channels at the same time, then the performance of the WLAN will not be anywhere as near as good as if the community of users were homogenous as being all 802.11b or 802.11g users.

Moreover, all of these associated problems can become even more exacerbated when the various devices within the WLAN are unable to process the various signal types efficiently. Some prior art approaches try to deal with this situation by provisioning a number of PHY (physical layer) receivers that each fully process a frame (or packet) of data received by the WLAN interactive device. The FIG. 2 shows an example of this prior art approach.

FIG. 2 is a diagram illustrating an example of a prior art WLAN (Wireless Local Area Network) interactive device. The WLAN interactive device includes a number of PHY receivers that are communicatively coupled to a bus that ties the PHY receivers to 1 or more higher protocol layers (such as a MAC (Medium Access Controller) and/or higher application layers in some instances). Each of the various PHY receivers may be specifically tailored to process received frames corresponding to the various type of frames that may be received by the WLAN interactive device. For example, one of the PHY receivers may be an 802.11b operable PHY receiver, and another of the PHY receivers may be an 802.11g operable PHY receiver. Using this prior art approach, the WLAN interactive device is then operable to processed received frames corresponding to some of the various amendments to the 802.11 standard, but this prior art approach comes with a very significant cost in terms of processing resources.

For example, a received frame is provided to each and every PHY receiver within such a prior art WLAN interactive device. Then, all of the PHY receivers simultaneously process (or sequentially process, which takes an even longer time to process) the received frame. In this prior art approach, only the proper PHY receiver for which the received frame is intended will output useful information. All of the other non-proper PHY receivers will output garbage information as those PHY receivers are not suitable to process the received frame. This is clearly a very costly approach in terms of hardware and processing resources within the WLAN interactive device, in that, each and every PHY receiver fully processes the received frame. For implementations where speed of processing and/or energy consumption are of paramount design consideration, this prior art approach presents a very non-optimal solution.

As such, there exists a need in the art for a solution to allow a WLAN interactive device to process a received frame in a manner that is much more efficient and that does not require all of the PHY receivers of the WLAN interactive device to process a received frame fully. The prior art does not present an adequate and efficient solution to address such deficiencies within WLAN interactive device implementation.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 8A is a diagram illustrating an embodiment of classifier functionality to determine whether to assert a PHY select signal based on claims made by PHYs according to the invention.

FIG. 8B is a diagram illustrating an embodiment of classifier functionality to determine whether to assert a PHY select signal based on claims made by PHYs and corresponding confidence levels according to the invention.

FIG. 10A is a diagram illustrating an embodiment of gain control functionality (during pre-processing of a received frame by all PHYs) according to the invention.

FIG. 10B is a diagram illustrating an embodiment of gain control functionality (during processing of a received frame only by an intended PHY) according to the invention.

DETAILED DESCRIPTION OF THE INVENTION

Figure 1A:
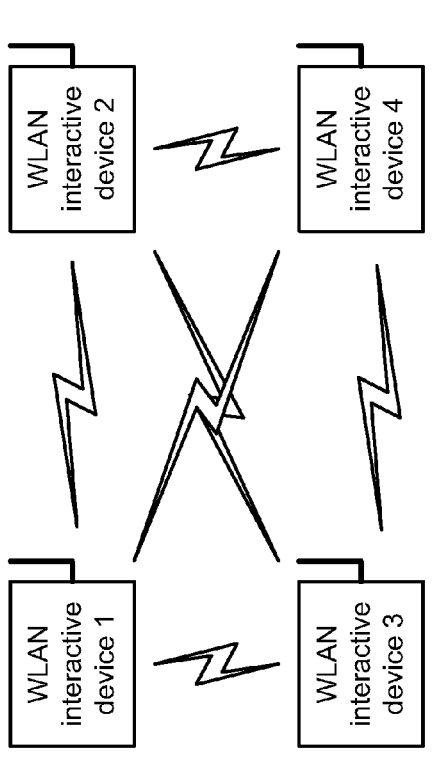
FIG. 1A is a diagram illustrating a prior art ad hoc WLAN (Wireless Local Area Network).
Figure 1B:
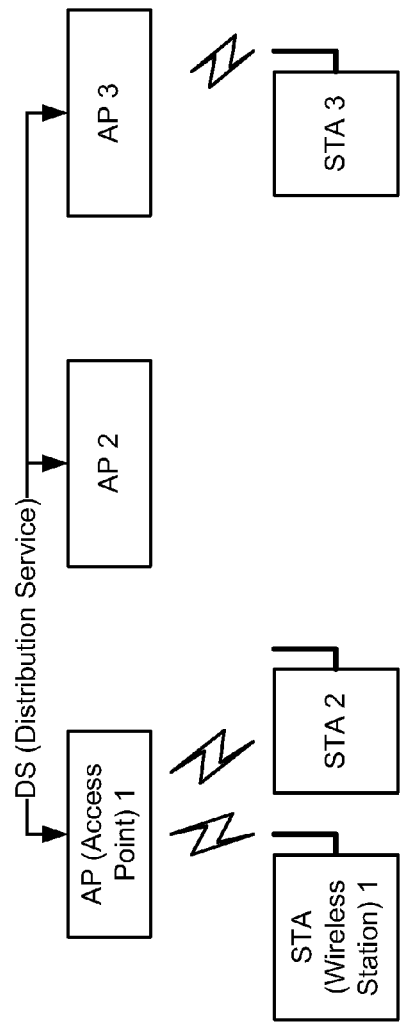
FIG. 1B is a diagram illustrating a prior art infrastructure/multiple AP (Access Point) WLAN.
Figure 2:
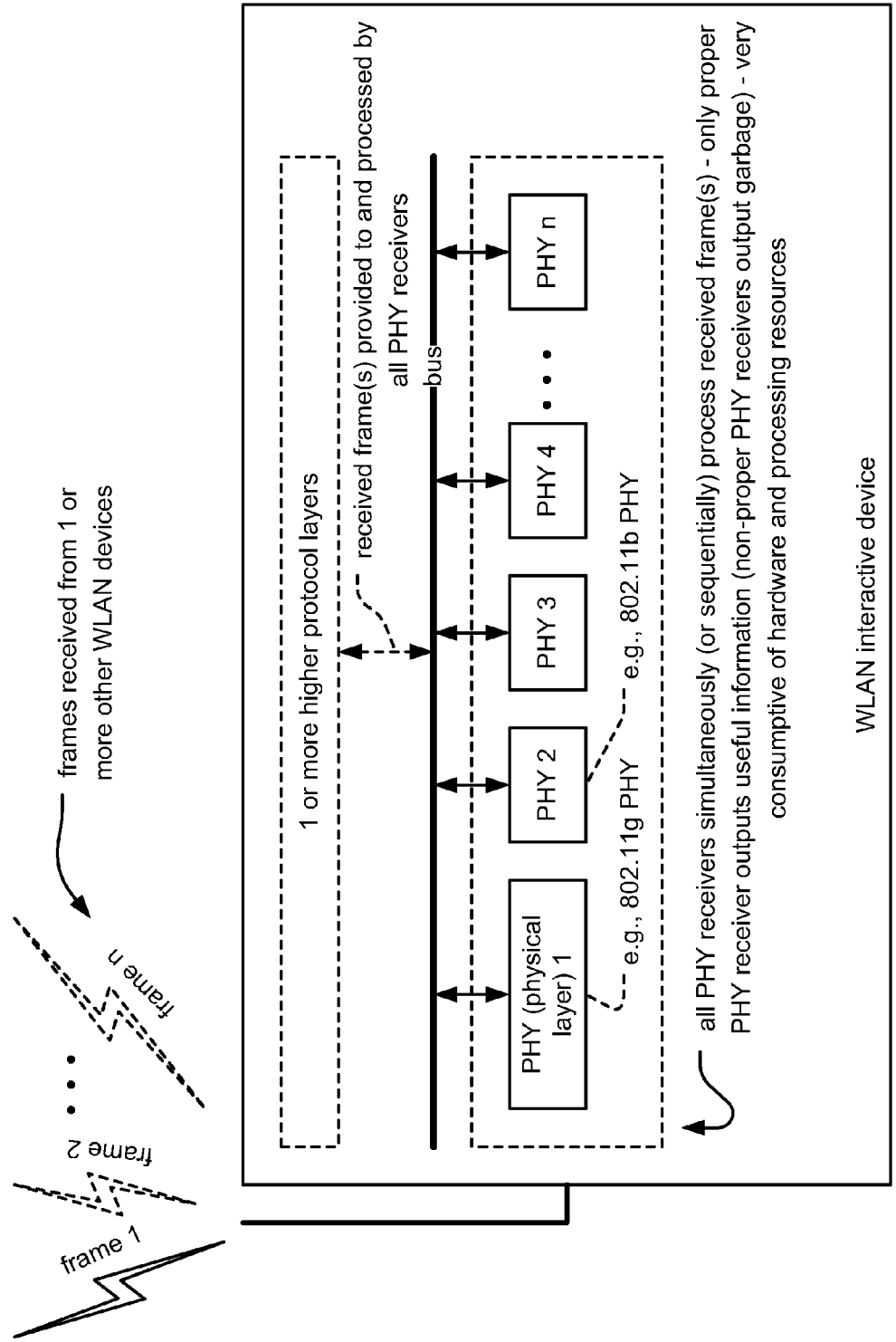
FIG. 2 is a diagram illustrating an example of a prior art WLAN interactive device.

The invention presents a novel solution to classify a frame (or packet) of data received by a WLAN (Wireless Local Area Network) interactive device with a minimal amount of pre-processing. In some instances, the WLAN interactive device that performs the classification according to the invention is an IEEE (Institute of Electrical & Electronics Engineers) 802.11g operable device that is also backward compatible with earlier amendments to the 802.11 standard. The WLAN interactive device may include a number of PHY (physical layer) receivers that may each be particularly adapted to deal with frames corresponding to the various amendments to the 802.11 standard (or even to frames that correspond to other types of standards or protocols as well). For example, the WLAN interactive device may include a first PHY receiver that is operable to accommodate received frames that comport with the 802.11b standard, and the WLAN interactive device may also include a second PHY receiver that is operable to accommodate received frames that comport with the 802.11g standard. Clearly, more than 2 PHY receivers may be implemented within such a WLAN interactive device without departing from the scope and spirit of the invention.

Rather than provide the received frame to each of the PHY receivers within the WLAN interactive device such that each PHY receiver fully processes (e.g., demodulated and decodes) the received frame, a classifier is implemented within the WLAN interactive device that is able to arbitrate claims made from the various PHY receivers and to ensure that the received frame is processed only by the PHY receiver for which the frame is intended (e.g., this PHY receiver may be referred to as an intended PHY receiver). There are a variety of ways in which this classification may be implemented according to the invention. For example, in one embodiment, a WLAN interactive device may include 2 separate PHY receivers: an 802.11b operable PHY receiver and an 802.11g operable PHY receiver. The 802.11b PHY receiver is operable to process DSSS/CCK (Direct Sequence Spread Spectrum with Complementary Code Keying) frames, and the 802.11g PHY receiver is operable to process OFDM (Orthogonal Frequency Division Multiplexing) frames.

Such a WLAN interactive device may in fact be an 802.11g operable device that supports communication according to the 802.11g standard and is also backward compatible with the 802.11b standard. When such a WLAN interactive device receives a frame that comports with the 802.11b standard, the classifier of the WLAN interactive device helps ensure that the received frame is processed by a DSSS/CCK PHY receiver. Analogously, when the WLAN interactive device receives a frame that comports with the 802.11g standard, the classifier of the WLAN interactive device helps ensure that the received frame is processed by an OFDM PHY receiver. This way, both of the PHY receivers need not fully process the received frame thereby freeing up processing resources within the WLAN interactive device and conserving energy.

Figure 3:
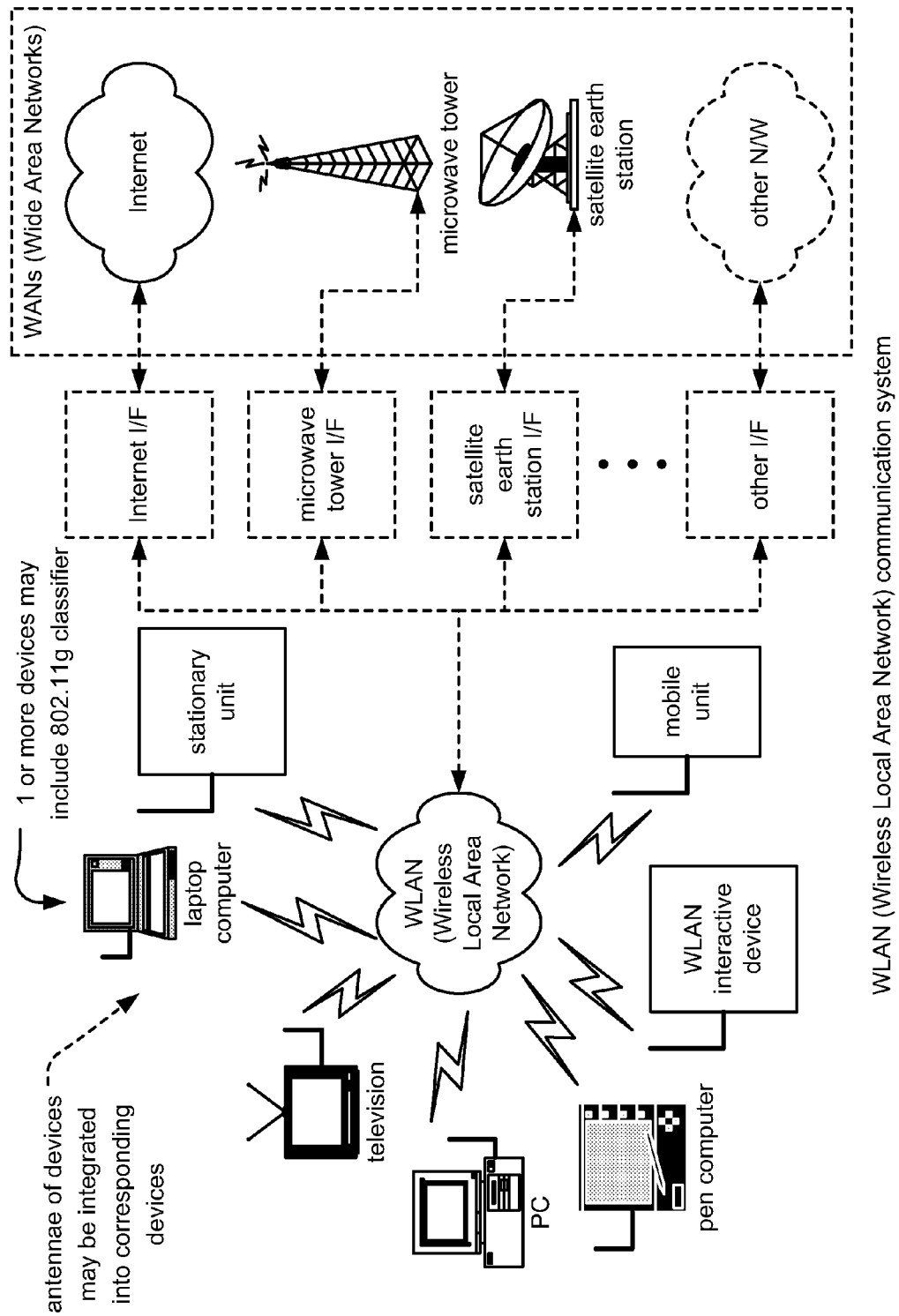
FIG. 3 is a diagram illustrating an embodiment of a WLAN that may be implemented according to the invention.

FIG. 3 is a diagram illustrating an embodiment of a WLAN (Wireless Local Area Network) that may be implemented according to the invention. The WLAN communication system may be implemented to include a number of devices that are all operable to communicate with one another via the WLAN. For example, the various devices that each include the functionality to interface with the WLAN may include a laptop computer, a television, a PC (Personal Computer), a pen computer (that may be viewed as being a PDA (Personal Digital Assistant) in some instances, a personal electronic planner, or similar device), a mobile unit (that may be viewed as being a telephone, a pager, or some other mobile WLAN operable device), and/or a stationary unit (that may be viewed as a device that typically resides in a single location within the WLAN). The antennae of the various WLAN interactive devices may be integrated into the corresponding devices without departing from the scope and spirit of the invention as well.

This illustrated group of devices that may interact with the WLAN is not intended to be an exhaustive list of device that may interact with a WLAN, and a generic device shown as a WLAN interactive device represents a generic device that includes the functionality in order to interactive with the WLAN itself and/or the other devices that are associated with the WLAN. Any of these devices that associate with the WLAN may be viewed generically as being the WLAN interactive device without departing from the scope and spirit of the invention. Each of the devices and the WLAN interactive device may be viewed as being located at nodes of the WLAN.

It is also noted that the WLAN itself includes functionality to allow interfacing with other networks as well. These external networks may generically be referred to as WANs (Wide Area Networks). For example, the WLAN may include an Internet I/F (interface) that allows for interfacing to the Internet itself. This Internet I/F may be viewed as being a base station device for the WLAN that allows any one of the WLAN interactive devices to access the Internet.

It is also noted that the WLAN may also include functionality to allow interfacing with other networks, such as other WANs, besides simply the Internet. For example, the WLAN may include a microwave tower I/F that allows for interfacing to a microwave tower thereby allowing communication with one or more microwave networks. Similar to the Internet I/F described above, the microwave tower I/F may be viewed as being a base station device for the WLAN that allows any one of the WLAN interactive devices to access the one or more microwave networks via the microwave tower.

Moreover, the WLAN may include a satellite earth station I/F that allows for interfacing to a satellite earth station thereby allowing communication with one or more satellite networks. The satellite earth station I/F may be viewed as being a base station device for the WLAN that allows any one of the WLAN interactive devices to access the one or more satellite networks via the satellite earth station I/F.

This finite listing of various network types that may interface to the WLAN is not intended to be exhaustive. For example, any other network may communicatively couple to the WLAN via an appropriate I/F that includes the functionality for any one of the WLAN interactive devices to access the other network.

The various WLAN interactive devices described within this embodiment may each be operable to support the classification functionality according to the invention. More details are provided below describing how this classification of received frames may be implemented.

As also briefly referred to above, the IEEE 802.11g standard extends the data rates for packet transmission in the 2.4 GHz frequency band. This is achieved by allowing packets, also known as frames, of two distinct types to coexist in this band. Frames utilizing DSSS/CCK (Direct Sequence Spread Spectrum with Complementary Code Keying) modulation have been specified for transmission in the 2.4 GHz band at rates up to 11 Mbps (Mega-bits per second) as part of the 802.11b standard. The 802.11a standard uses a different frame format with OFDM (Orthogonal Frequency Division Multiplexing) modulation to transmit at rates up to 54 Mbps with carrier frequencies in the 5 GHz band. The 802.11g standard allows for such OFDM frames to coexist with DSSS/CCK frames at 2.4 GHz. However, the properties of these two different types of frames, as well as their processing at an 802.11g receiver, are very different. Also, this portion of the frequency spectrum is unlicensed, so there are many other non-packet signals present in this band which should be ignored by an 802.11g receiver. Successful reception of both DSSS/CCK frames and OFDM frames requires a mechanism for classifying a received signal as a DSSS/CCK frame, an OFDM frame, a type of frame that the device is incapable to process, or some other energy associated with perhaps another frame or protocol type.

Figure 4:
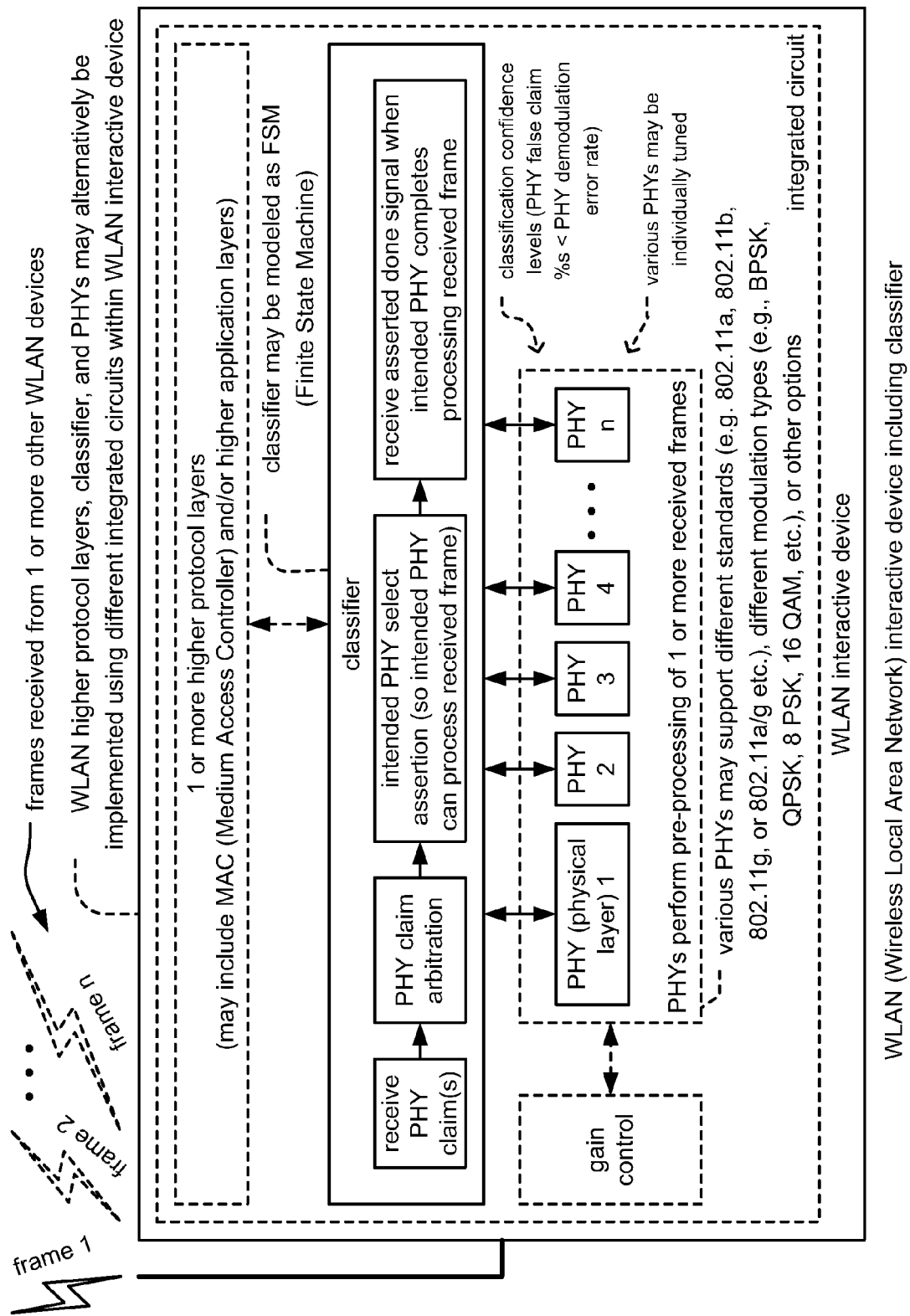
FIG. 4 is a diagram illustrating an embodiment of a WLAN interactive device, including a classifier, that is built according to the invention.

FIG. 4 is a diagram illustrating an embodiment of a WLAN interactive device, including a classifier, that is built according to the invention. Within this embodiment, the WLAN interactive device includes a plurality of PHY receivers (shown as a PHY 1, a PHY 2, a PHY 3, a PHY 4, . . . and a PHY n). Each of the PHY receivers may be implemented to support different standards such as the 802.11a standard, the 802.11b standard, and the 802.11g standard. In addition, these various PHY receivers may be implemented such that the various PHY receivers accommodate different modulation types including BPSK (Binary Phase Shift Key), QPSK (Quadrature Phase Shift Key), 8 PSK (8 Phase Shift Key), 16 QAM (16 Quadrature Amplitude Modulation), and even other sometimes higher order modulation types. By providing a plurality of PHY receivers, the WLAN interactive device can communicate within a variety of different types of WLANs as well as with a variety of different WLAN interactive devices.

These PHY receivers are all communicatively coupled to a classifier. The classifier may be communicatively coupled to 1 or more higher protocol layers within the WLAN interactive device such as a MAC (Medium Access Controller) and/or 1 or more other higher application layers. The WLAN interactive device includes an antenna that is operable to communicate with the WLAN. Various types of frames may be received by the WLAN interactive device (shown as a frame 1, a frame 2, . . . , and a frame n). These frames may be transmitted to the WLAN interactive device from 1 or more other WLAN interactive devices.

After the frame is received by the WLAN interactive device, the various PHY receivers perform pre-processing of the received frame to calculate confidence levels that are used to perform the classification of the received frame. There are a number of ways in which the confidence levels may be calculated including correlation processing. Some possible embodiments are described below. For those PHY receivers that calculate a confidence level for the received frame that exceeds a threshold that is specific to that PHY receiver, those PHY receivers assert a claim to the classifier for the received frame. The thresholds may be predetermined, adaptively modified according to the operating conditions of the WLAN, and they may be individually tuned for each of the various PHY receivers. That is to say, each of the PHY receiver may employ a different threshold for use in comparing its calculated confidence level to determine whether that PHY receiver should assert a claim to the classifier.

There may be instances where more than 1 PHY receiver asserts a claim to the classifier. In such instances, the classifier is operable to arbitrate these multiple claims and to prioritize them. A designer of such a WLAN interactive device may select the particular tie-breaking approaches that are employed to arbitrate between competing claims. The arbitration rules (e.g., the tie-breaking approaches) manner in which multiple claims are prioritized may be different within different applications.

After the classifier arbitrates between any competing claims, the classifier then ensures that the received frame may be fully processed only by the appropriate PHY receiver for which the received frame is intended; this PHY receiver may be viewed as being an intended PHY receiver. The classifier may select the appropriate PHY receiver by asserting a PHY select signal to the intended PHY receiver and de-asserting PHY select signals to the other PHY receivers (e.g., the non-intended PHY receivers). The other PHY receivers need not fully process the received frame. This inherently conserves processing resources of the WLAN interactive device.

If desired, gain control functionality may also be supported for the various PHY receivers within the WLAN interactive device. A received frame may be scaled to a range that is appropriate for the PHY receivers. This gain control may be further broken down as being different during pre-processing of the received frame by all of the PHY receivers and during processing of the received frame by only the intended PHY receiver. For example, a coarse gain control may be employed during the pre-processing of the received frame by all of the PHY receivers that substantially comports with the dynamic ranges of most of the PHY receivers. Also, a fine gain control may be employed during the processing of the received frame by the intended PHY receiver that specifically comports with the dynamic range of the intended PHY receiver.

This gain control functionality may be desired in some applications when considering the following. For example, some of the different PHY receivers may have been designed to expect to receive signals having different dynamic ranges. After the classifier determines to which PHY receiver the received frame is intended and which is to process the received frame, the gain control functionality may then scale the received frame to a range that is more compatible with the range that the intended PHY receiver expects for signals that it receives and processes.

After the intended PHY receiver fully processes the received frame, the intended PHY receiver asserts a done signal to the classifier notifying the classifier that the intended PHY receiver has finished its processing of the received frame. It is also noted that the classifier itself may be modeled as being a FSM (Finite State Machine). Several embodiments are also described herein that employ state diagrams to model the functionality of the classification performed according to the invention.

There may also be instances where the received frame is in fact not intended for any of the various PHY receivers within the WLAN interactive device. In such instance, however, the WLAN interactive device may in fact perform the detection of some energy within the WLAN of even perform the detection of a received frame that the particular WLAN interactive device is incapable to process. One or more of the PHY receivers may be implemented to perform energy detection in that instance. In addition, 1 or more of the PHY receivers may be implemented as a reduced functionality set PHY receiver that is operable to perform detection of a received frame and to ensure that the WLAN interactive device times-out in an idle state during a predetermined time that is set aside for processing that received frame (perhaps by another WLAN interactive device for which the received frame is intended). For example, these reduced functionality set PHY receivers may be viewed as including some functionality (to perform identification of the received type), yet not including the processing resources to process the received frame fully. Such a solution may be desirable to design a WLAN interactive device that may be operable within a wide variety of WLAN types.

As an example of the ED (Energy Detect) functionality that may be supported by 1 or more of the PHY receivers, there may be instances where some energy is in fact existent within the WLAN, yet this received frame corresponds to none of the PHY receivers implemented within the WLAN interactive device. In such instances, the WLAN interactive device may be timed-out or held in an idle state to allow some other WLAN interactive device that may include an appropriate PHY receiver capable to process that received frame. For example, the WLAN interactive device may time-out for a period of time (e.g., not allow transmission or receipt of any frames during to/from it for that time) or monitor that existent energy and wait until it dissipates. In this manner, the WLAN interactive device will not interfere with another WLAN interactive device for which that existent energy (e.g., or a frame associated with it) may be intended. The WLAN interactive device may employ energy detection functionality alone or in conjunction with the confidence level functionality when determining whether or not the received frame is intended for the WLAN interactive device as well as determining whether or not to enter into a time-out period (that inhibits transmission and/or receipt of frames).

It is also noted that the classifier and the various PHY receivers, as well as any higher protocol layers may be implemented within WLAN interactive device in a variety of different ways. For example, in one embodiment, each of the various functional blocks may be implemented within different integrated circuits. Alternatively, a single integrated circuit may be implemented to include all of the various functional blocks (e.g., all of the PHY receivers, the classifier, as well as any higher protocol layers). Moreover, various combinations may be implemented. for example, another alternative embodiment may include 1 or more of the PHY receivers being implemented within a first integrated circuit, the remaining PHY receivers being implemented within a second integrated circuit, and the classifier and any higher protocol layers being implemented within a third integrated circuit. Clearly, other combinations may also be implemented without departing from the scope and spirit of the invention.

Figure 5:
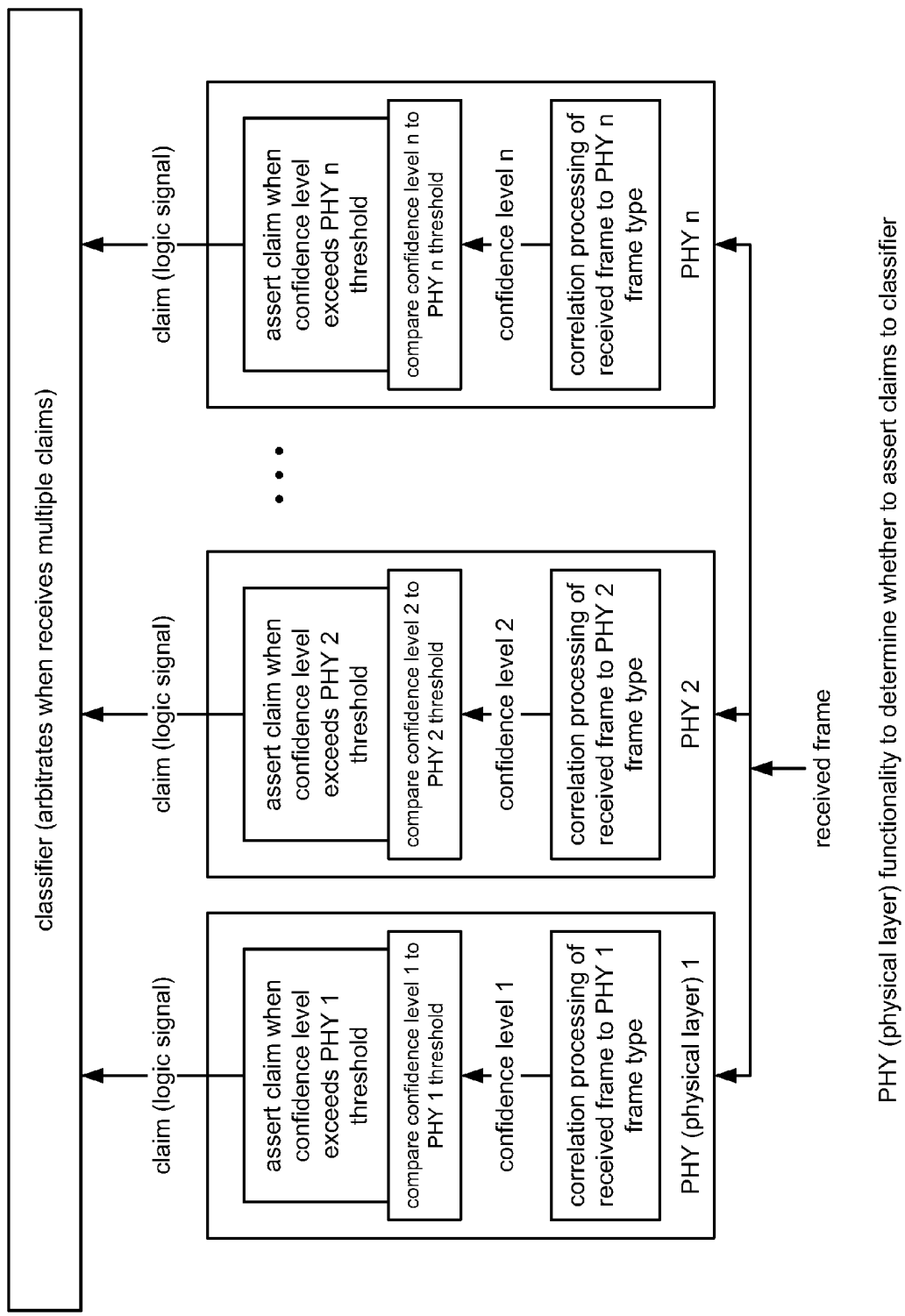
FIG. 5 is a diagram illustrating an embodiment of PHY (physical layer) functionality to determine whether to assert claims to a classifier according to the invention.

FIG. 5 is a diagram illustrating an embodiment of PHY (physical layer) functionality to determine whether to assert claims to a classifier according to the invention. This embodiment shows one embodiment of how each of the various PHY receivers that may be implemented within a device determines whether to assert a claim to a classifier for the received frame.

Each of the PHY receivers performs this pre-processing of the received frame to determine whether to assert a claim. For each PHY receiver, this initially involves performing correlation processing of the received frame to a frame type for which that PHY receiver is tailored. For example, a PHY 1 receiver performs correlation processing of the received frame to a PHY 1 frame type. A confidence level is then determined from this correlation processing. For each PHY receiver, its respective calculated confidence level is compared to a threshold that is specific to that PHY receiver. For example, a confidence level 1 is compared to a PHY 1 threshold within the PHY 1 receiver. For each of the PHY receivers, when its calculated confidence level exceeds its PHY-specific threshold, then that PHY receiver asserts a claim for the received frame to the classifier in an attempt for that PHY receiver to be granted as the PHY receiver to process the received frame fully. For example, when the confidence level 1 exceeds the PHY 1 threshold, then the PHY 1 receiver asserts a claim to the classifier for the right to process the received frame.

There may be instances where more than 1 of the PHY receivers asserts a claim to the classifier. In such instances, the classifier is operable to arbitrate the among these multiple claims to assert a PHY select signal to the PHY for which the received frame was in fact intended (e.g., assert a PHY select signal to the intended PHY receiver). In this embodiment the classifier only performs the arbitration of the claims provided thereto based on the claim signals themselves. Other embodiments are also presented herein that include considering the confidence levels themselves.

Figure 6:
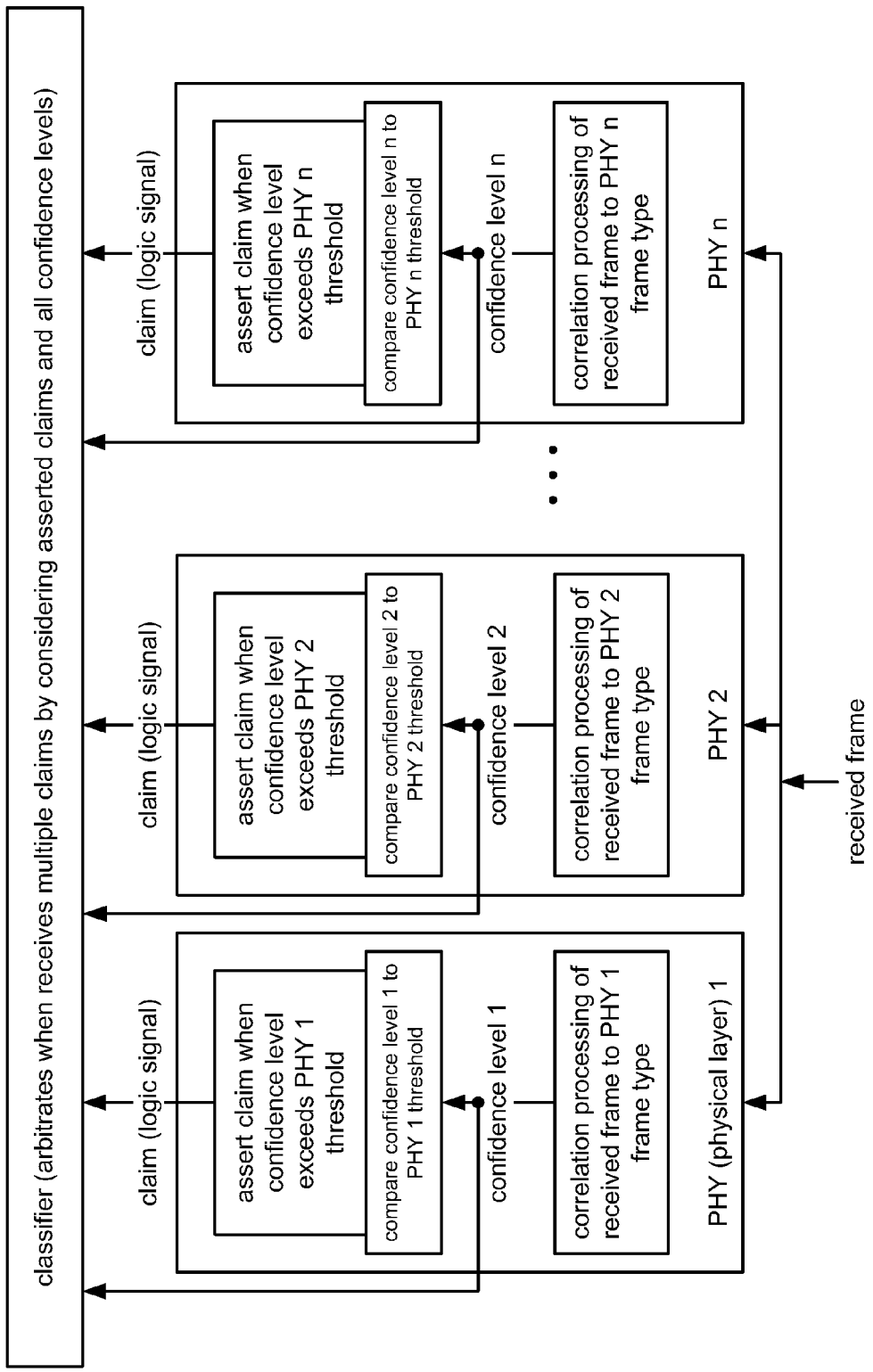
FIG. 6 is a diagram illustrating an embodiment of PHY functionality to determine whether to assert claims (while always providing confidence levels) to a classifier according to the invention.

FIG. 6 is a diagram illustrating an embodiment of PHY functionality to determine whether to assert claims (while always providing confidence levels) to a classifier according to the invention. This embodiment is similar to the embodiment described above within the FIG. 5 with a difference being the confidence levels are also always provided to the classifier. Similar pre-processing is performed by each of the PHY receivers to determine whether to assert a claim to the classifier or not for the received frame. However, the classifier may now make use of the confidence level information provided thereto in performing the arbitration of multiple claims.

As an example, a tie-breaking approach may be employed between claims from 2 separate PHYs when their respective confidence levels are within a sufficiently close range of one another. However, another tie-breaking approach may be employed when one of the confidence levels is sufficiently higher than the other. In addition, this embodiment allows the classifier to consider the confidence levels of those PHY receivers that do not necessarily assert claims to the classifier.

Figure 7:
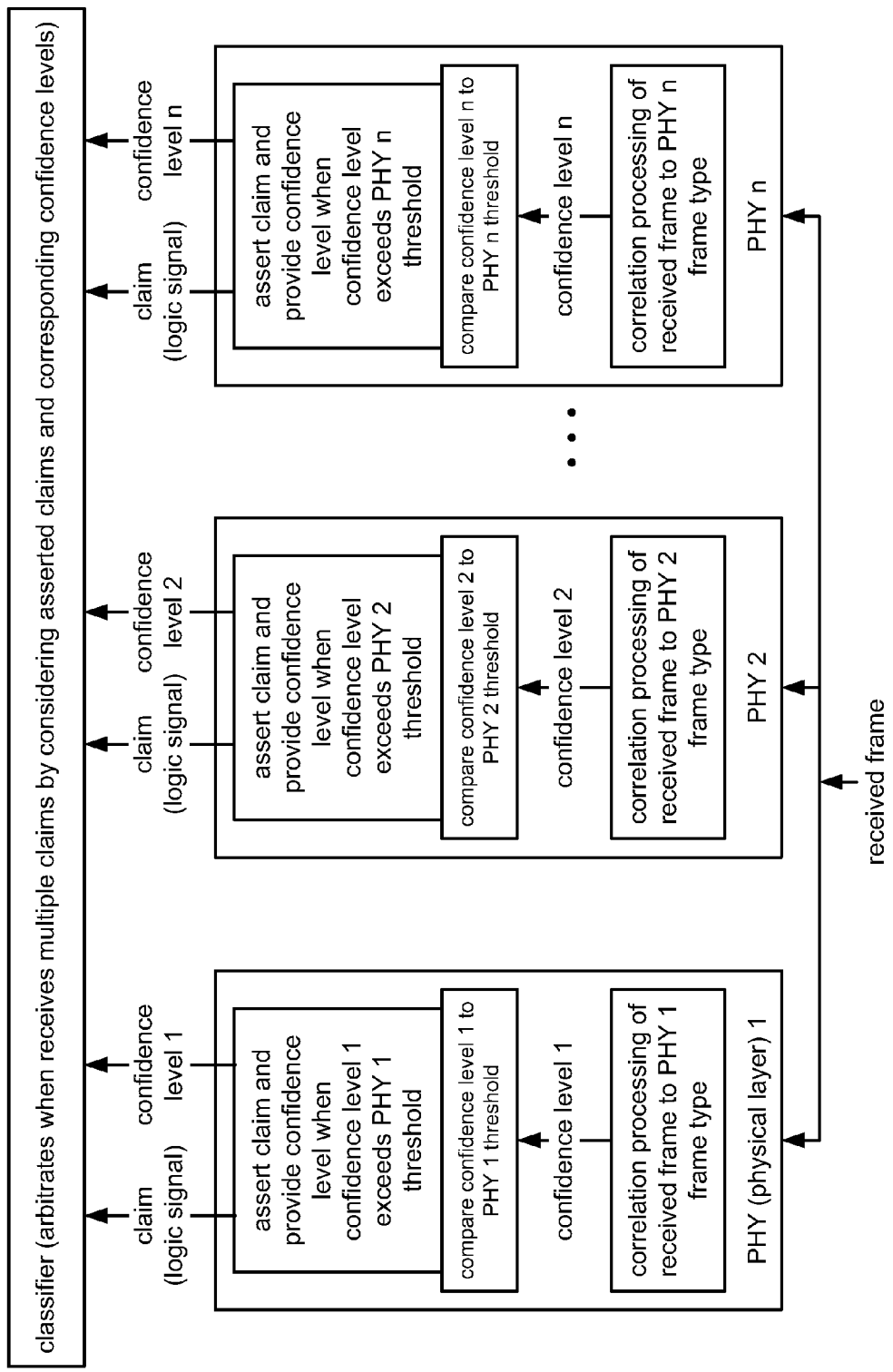
FIG. 7 is a diagram illustrating an embodiment of PHY functionality to determine whether to assert claims and whether to provide confidence levels to a classifier according to the invention.

FIG. 7 is a diagram illustrating an embodiment of PHY functionality to determine whether to assert claims and whether to provide confidence levels to a classifier according to the invention. This embodiment is also similar to the embodiment described above within the FIG. 5 with a difference being the confidence levels are selectively provided to the classifier only from those PHY receivers that actually assert claims to the classifier. Again, similar pre-processing may be performed by each of the PHY receivers to determine whether to assert a claim to the classifier or not for the received frame. However, only those PHY receivers that eventually assert a claim to the classifier also provide their respective confidence levels to the classifier as well. This embodiment is different than the embodiment for the FIG. 6, in that, the confidence levels are only selectively provided in this embodiment. In the embodiment of the FIG. 6, the confidence levels are always provided to the classifier from all of the PHY receivers even if a particular PHY receiver does not assert a claim to the classifier. However, in this embodiment of the FIG. 7, the confidence levels are selectively provided to the classifier from only those PHY receivers that actually assert a claim to the classifier.

Any tie-breaking arbitration approach performed by this embodiment, when compared to the embodiment of the FIG. 6, may be a bit more limited, in that, all of the respective confidence levels are not available (e.g., only the confidence levels from the PHY receivers that assert a claim are available). However, even with this information of asserted claims and confidence levels, more advanced arbitration rules may be employed as opposed to those that only include the use of asserted claims (e.g., as within the embodiment of the FIG. 5).

The embodiments of the FIG. 8A and the FIG. 8B show, in a bit more detail, some of the manners in which a classifier may employ rules of arbitration based on information provided thereto that may include asserted claims as well as confidence levels in some instances.

FIG. 8A is a diagram illustrating an embodiment of classifier functionality to determine whether to assert a PHY select signal based on claims made by PHYs according to the invention. This embodiment shows how a classifier receives only claims from only certain PHY receivers. For example, some correlation type processing may be performed within the respective PHY receivers to determine whether to assert a claim or not. For a PHY receiver whose confidence level exceeds a threshold corresponding to that particular PHY receiver, a claim signal (implemented as a logic signal in this embodiment) is asserted to the classifier. Multiple claim assertions may be made to the classifier from multiple PHY receivers.

When the classifier receives multiple claims from more than one PHY receiver, the classifier employs arbitration rules to select one of the PHY receivers as being the winner. For example, this embodiment shows a PHY 1 receiver and a PHY n receiver asserting claims to the classifier for a received frame. However, a PHY 2 receiver does not assert a claim. Therefore, the classifier needs to arbitrate among the claims asserted by the PHY 1 receiver and the PHY n receiver. The classifier then performs arbitration of the claims from the PHY 1 receiver and the PHY n receiver according to arbitration rules. If desired, the arbitration rules employed by the classifier may differ dependent on the particular claims that are asserted by the various PHY receivers. For example, one set of arbitration rules may be employed when arbitrating claims asserted by PHY receivers 1 and 2; another set of arbitration rules may be employed when arbitrating claims asserted by PHY receivers 1 and n; and another set of arbitration rules may be employed when arbitrating claims asserted by PHY receivers 2 and n. Moreover, even another set of arbitration rules may be employed when arbitrating claims asserted by PHY receivers 1, 2, and n. Clearly, a wide variety of arbitration rules may be performed without departing from the scope and spirit of the invention. In addition, a single set of arbitration rules may also be performed as well without departing from the scope and spirit of the invention.

After the classifier employs the arbitration rules to the multiple asserted claims, the classifier then asserts a PHY select signal to the PHY receiver as being the winner according to the particular arbitration rules employed by the classifier. This embodiment shows the PHY n as being the winner according to the arbitration rules. In this embodiment, the PHY select signal is a logic signal as are the claim signals. This PHY select signal made by the classifier may be viewed as being a grant signal made to the PHY n receiver such that the PHY n receiver now has been granted the right to process the received frame of concern.

FIG. 8B is a diagram illustrating an embodiment of classifier functionality to determine whether to assert a PHY select signal based on claims made by PHYs and corresponding confidence levels according to the invention. This embodiment is relatively similar to the embodiment of the FIG. 8A with the exception that confidence level is also provided to the classifier to assist in its selecting of a winner among multiple claims made by PHY receivers. The arbitration of claims from multiple PHY receivers may be made by considering arbitration rules based on claims as well as arbitration rules based on confidence levels. The confidence levels provided by the PHY receivers may be performed as a matter of course (as always being provided from all of the PHY receivers for each received frame, as described above) or it may be performed selectively (as only being provided from those PHY receivers that actually assert a claim to the classifier). In general, this embodiment is similar to the embodiment of the FIG. 8A except that this embodiment also has the benefit of richer information by which to perform its arbitration. That is to say, this embodiment also benefits from having the confidence levels from some or all of the PHY receivers.

Figure 9:
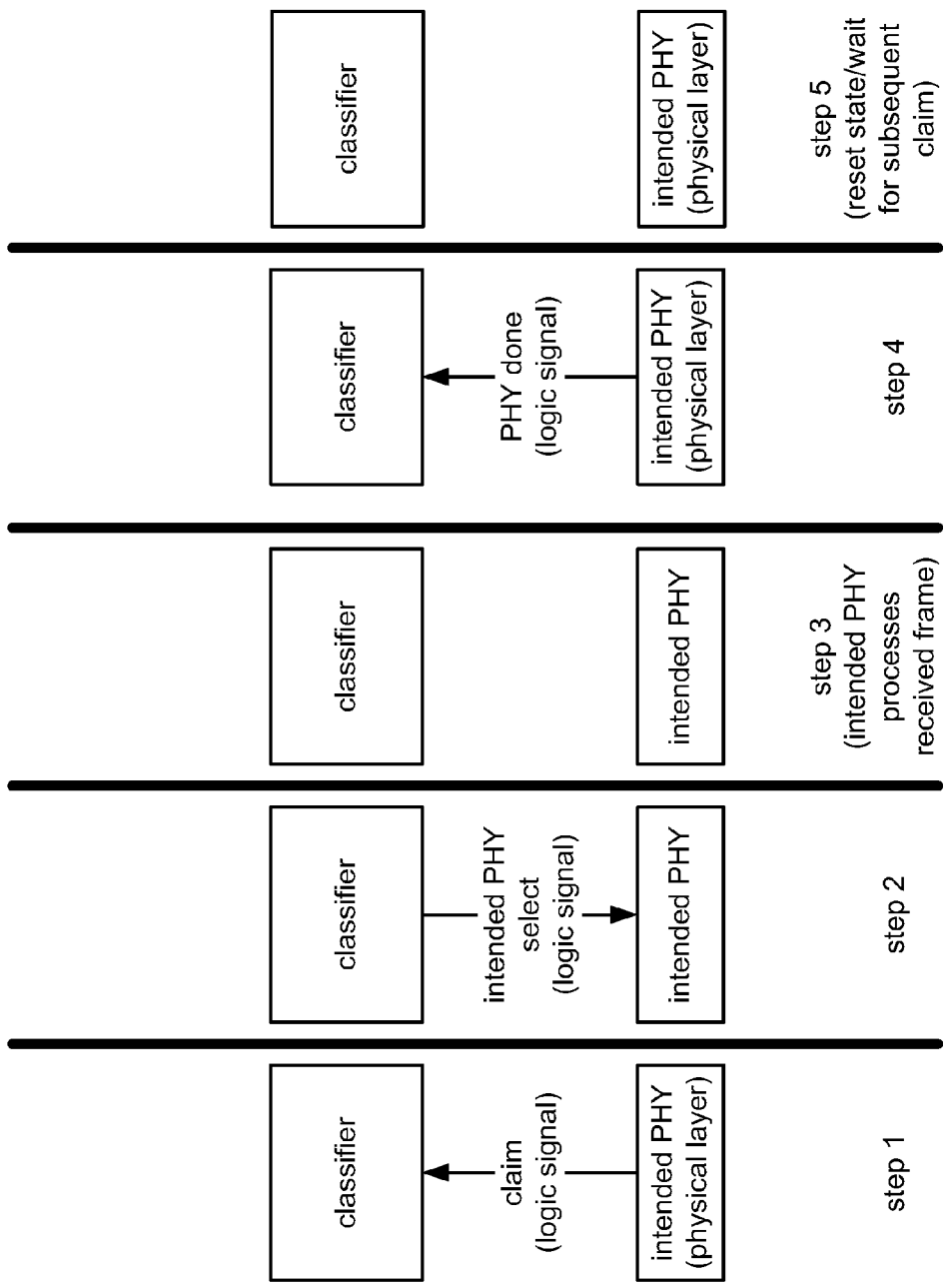
FIG. 9 is a diagram illustrating an embodiment of classifier/PHY functionality as a function of steps (shown with respect to the intended PHY/classifier interface) according to the invention.

FIG. 9 is a diagram illustrating an embodiment of classifier/PHY functionality as a function of steps (shown with respect to the intended PHY/classifier interface) according to the invention. This embodiment shows generally the processing steps and the interaction between a PHY receiver and a classifier. The PHY receiver shown in this embodiment is the actually intended PHY receiver.

In a step 1, the intended PHY receiver asserts a claim to the classifier. As with some of the other embodiments described herein, the claim signal is shown as being a logic signal. In a step 2 the classifier asserts an intended PHY select signal to the intended PHY receiver. The intended PHY select signal is shown as being a logic signal.

Then, once the intended PHY has been granted the right to process a received frame, the intended PHY receiver actually processes the received frame as shown in a step 3. After the intended PHY receiver finishes processing the received frame, the intended PHY receiver asserted a PHY done signal to the classifier as shown in a step 4. The PHY done signal is shown as being a logic signal.

Then, in a step 5, now that the intended PHY receiver has completed processing the received frame, and the classifier has been notified of this, both the intended PHY receiver and the classifier now return to a reset state where they wait for a subsequent received frame to be received and a corresponding claim to be asserted to the classifier from this intended PHY receiver (if the subsequent received frame corresponds to this intended PHY receiver) or from another "intended" PHY receiver for which the next subsequent received frame does in fact correspond. The interaction between the particular PHY receiver for which the subsequent received frame does in fact correspond will be analogous to the interaction shown here between the intended PHY receiver and the classifier in this embodiment.

The embodiments of the FIG. 10A and the FIG. 10B show the bifurcated gain control functionality that may be performed when pre-processing and processing a received frame.

FIG. 10A is a diagram illustrating an embodiment of gain control functionality (during pre-processing of a received frame by all PHYs) according to the invention. A RF (Radio Frequency) front-end receives the signal, that includes the received frame in question, from the antenna of the device. The RF front-end then provides this received frame to each of the PHY receivers of the device.

During the pre-processing of a received frame by all of the PHY receivers of a device, a coarse gain control is performed on the received frame that is provided to all of the PHY receivers. This coarse gain control corresponds generally to a gain that is appropriate for all of the family of PHY receivers of the device. That is to say, this coarse gain control is generally tuned to the aggregate of the characteristics of the various PHY receivers of the device. This coarse gain control is shown as being provided by a gain control functional block that is external to the various PHY receivers. The coarse gain control is used to direct the RF front-end to perform the actual scaling of the received frame; that is to say, the RF front-end may be viewed as a relatively "dumb" device, in this embodiment, where it simply performs the appropriate scaling of the received frame based on the coarse gain control provided thereto (e.g., the RF front-end itself does not determine to what degree the received frame should be scaled). The gain control functional block may also include fine gain control that may be used subsequently as described with respect to the FIG. 10B.

The coarse gain control provided by the gain control functionality may be viewed as being a gain control that is operable to direct the RF front-end to perform the scaling of the received frame to a range that is appropriate for the aggregate of the PHY receivers within the device.

FIG. 10B is a diagram illustrating an embodiment of gain control functionality (during processing of a received frame only by an intended PHY) according to the invention. After the intended PHY receiver for which the received frame has asserted its claim to the classifier for the received frame, and assuming that the classifier grants that PHY receiver the right to process the received frame (e.g., according to a PHY select signal from the classifier to that PHY receiver), then the gain control functional block may provide fine gain control to the RF front-end such that the RF front-end scales the received frame to a range that is specifically appropriate for the intended PHY receiver. That is to say, the RF front-end then scales the received frame to a range that is appropriate for the intended PHY receiver that actually processes the received frame.

This fine gain control provided by the gain control functionality may be viewed as being a gain control operable to perform the scaling of the received frame to a particular range that is tailored specifically for the intended PHY receiver that actually processes the received frame. Once again, the RF front-end may be viewed as a relatively "dumb" device, in this embodiment, where it simply performs the appropriate scaling of the received frame based on the fine gain control provided thereto (e.g., the RF front-end itself does not determine to what degree the received frame should be scaled for the intended PHY receiver).

This embodiment shows the fine gain control being employed to direct the RF front-end to scale the received frame to a range that is appropriate for PHY 2 receiver (which is shown as being the intended PHY receiver in this embodiment). However, the fine gain control within the gain control functional block may include a plurality of fine gain control values corresponding to each of the PHY receivers. For example, a specifically tailored fine gain control value may be included within the gain control functional block that corresponds to a particular PHY receiver within the device. This may be true for each of the PHY receivers within the device as well; each PHY receiver has a corresponding specifically tailored fine gain control value included within the gain control functional block.

Figure 11:
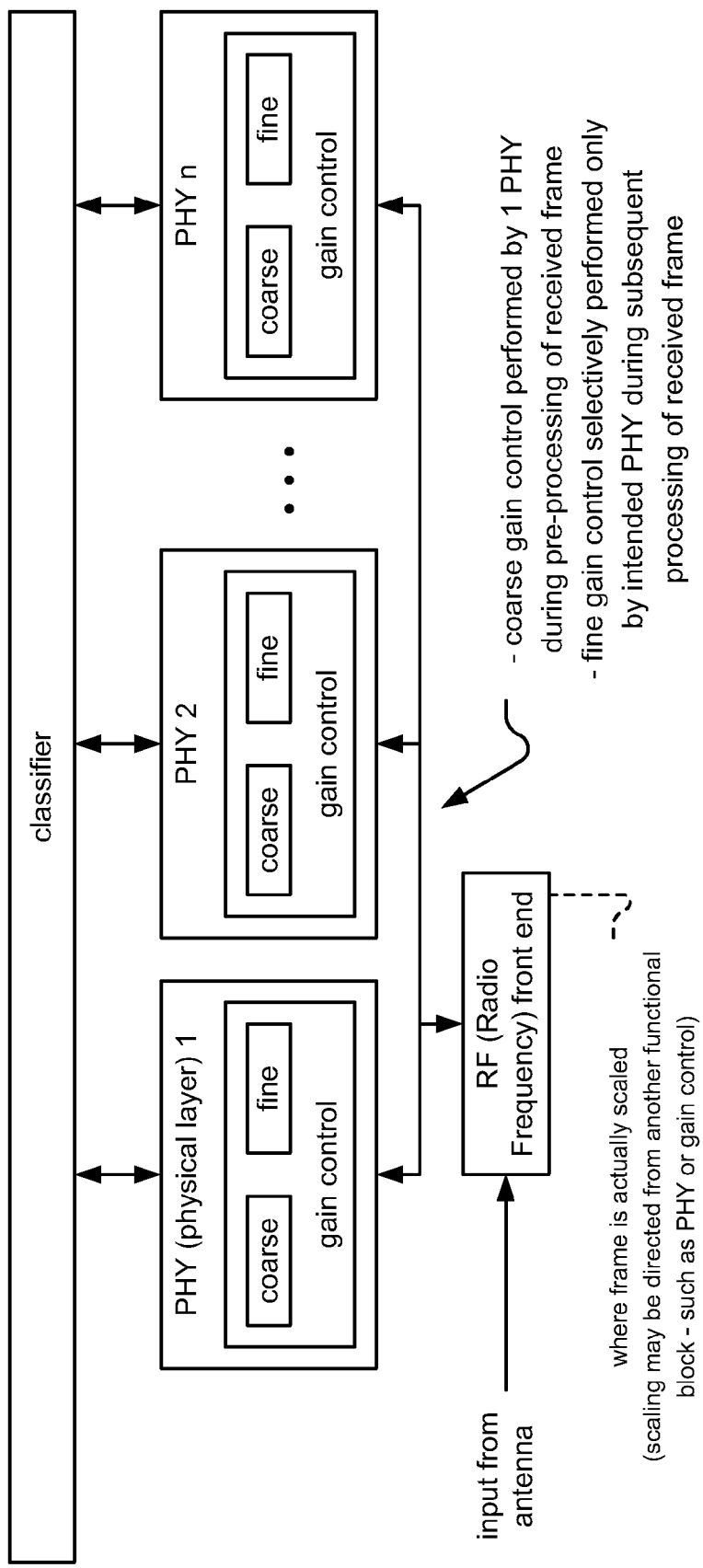
FIG. 11 is a diagram illustrating an embodiment of gain control functionality (as controlled individually within the respective PHYs) according to the invention.

FIG. 11 is a diagram illustrating an embodiment of gain control functionality (as controlled individually within the respective PHYs) according to the invention. Within the embodiments described above with respect to the FIG. 10A and the FIG. 10B, the fine gain control and the coarse gain control is provided by a gain control functional block that is external to the PHY receivers. Within this embodiment, that fine gain control and that coarse gain control is provided from within each of the PHY receivers. For example, one of the PHY receivers may appropriately employ coarse gain control to direct the RF front-end to scale the received frame during pre-processing. Then, for the PHY receiver that is granted the intended PHY receiver status, that intended PHY receiver may employ its particular fine gain control to direct the RF front-end to perform appropriate scaling of the received frame during processing of the received frame. Similarly, another PHY receiver that is granted the intended PHY receiver status may employ its particular fine gain control for appropriate scaling of a received frame during processing of that particular received frame.

Once again, as with the embodiments described above with respect to FIG. 10A and FIG. 10B, the RF front-end may be viewed as a relatively "dumb" device where it simply performs the appropriate scaling of the received frame based on the gain control provided thereto, be it coarse gain control or fine gain control (e.g., the RF front-end itself does not determine to what degree the received frame should be scaled). However, the invention does also envision alternative embodiments where the RF front-end may alternatively include integrated gain control functionality to perform similar coarse and fine gain control as described herein.

Figure 12:
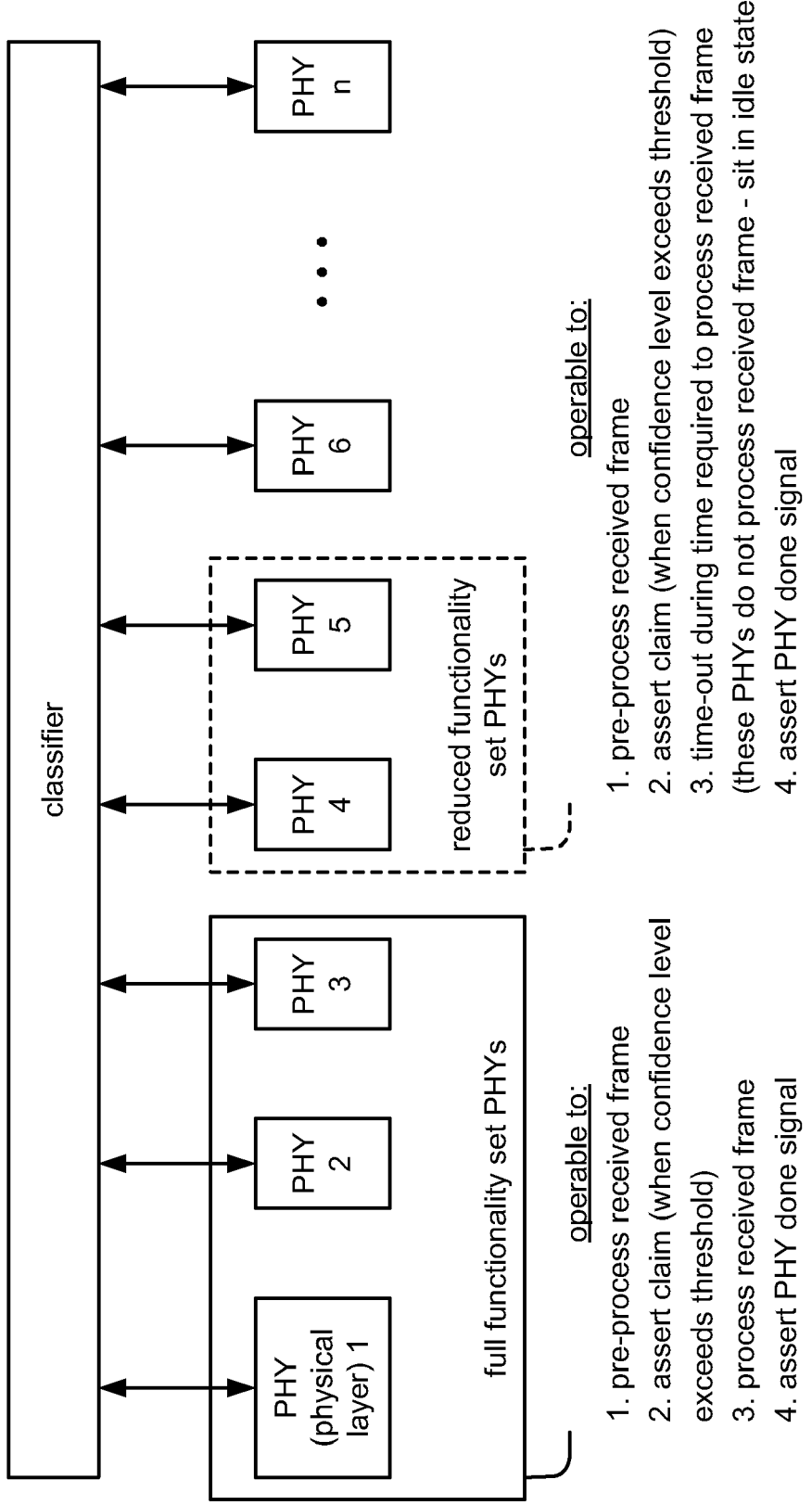
FIG. 12 is a diagram illustrating an embodiment of reduced functionality set PHYs implemented within a WLAN interactive device according to the invention.

FIG. 12 is a diagram illustrating an embodiment of reduced functionality set PHYs implemented within a WLAN interactive device according to the invention. This embodiment shows how some PHY receivers may be implemented as full functionality set PHY receivers and how some PHY receivers may be implemented as reduced functionality set PHY receivers.

The full functionality set PHY receivers include all of the appropriate functionality described herein. For example, these full functionality set PHY receivers are operable to pre-process a received frame, to assert a claim to the classifier when the confidence level generated during pre-processing is above a threshold appropriate for that PHY receiver, to process the received frame when granted that right from the classifier, and to assert a PHY done signal to the classifier upon completion of the processing of the received frame.

In contrast, the reduced functionality set PHY receivers include all of the appropriate functionality described herein. For example, these reduced functionality set PHY receivers are operable to pre-process a received frame, to assert a claim to the classifier when the confidence level generated during pre-processing is above a threshold appropriate for that PHY receiver, to time-out during a time in which a full functionality set PHY receiver requires to process the received frame, and to assert a PHY done signal to the classifier when that time-out period has elapsed.

In general, the reduced functionality set PHY receivers may be viewed as those PHY receivers that are not necessarily operable to perform processing of a received frame in a given application, yet may be desirable to allow the device that includes the PHY receivers to be implemented within a variety of types of applications. For example, a particular device may be implemented within an application such that it is desirable to ascertain that a received frame is not necessarily intended for that device, yet it is desirable to determine for which types of PHY receiver the received frame is in fact intended. This will allow the device to time-out selectively and intelligently during time period in which the received frame is being processed by another device that may include an appropriate full functionality set PHY receiver that is in fact capable to process the received frame. By having some reduced functionality set PHY receivers within a device, the device may be implemented across a broad spectrum of applications venues.

Figure 13:
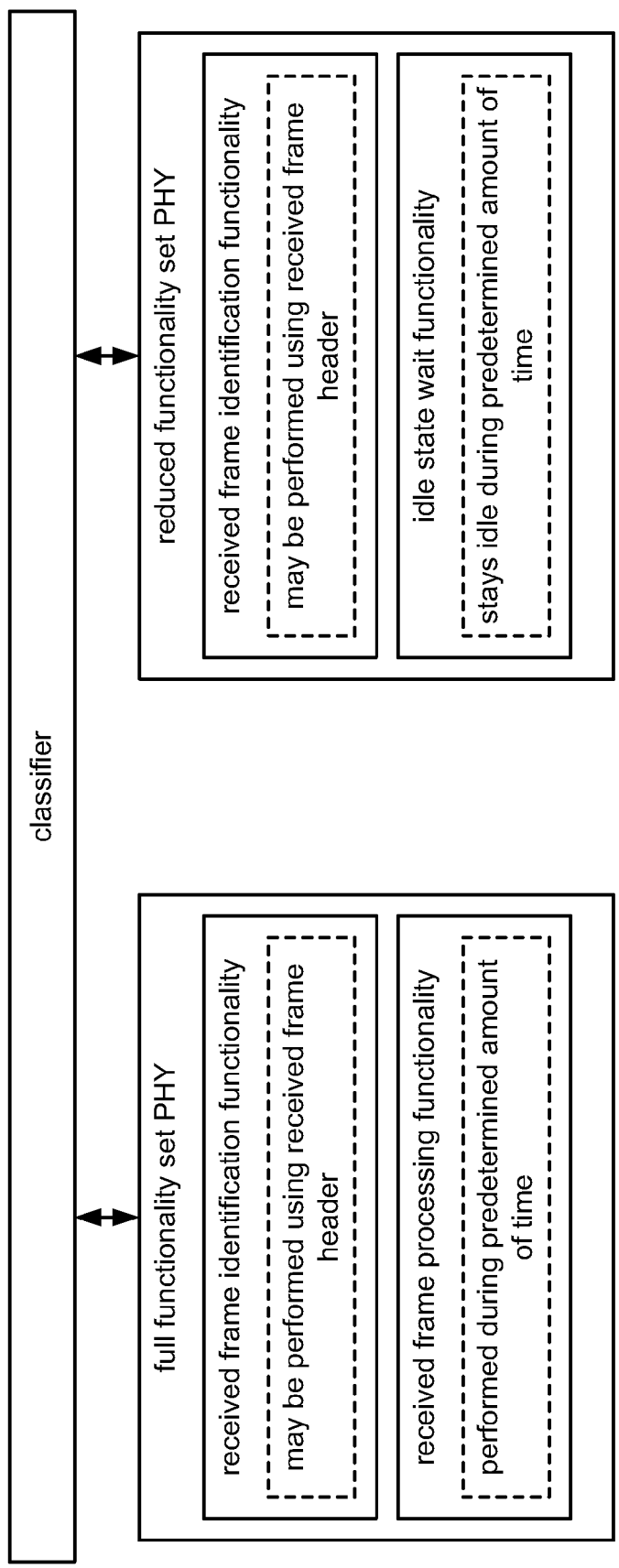
FIG. 13 is a diagram illustrating an embodiment of a full functionality set PHY and a reduced functionality set PHY implemented within a WLAN interactive device according to the invention.

FIG. 13 is a diagram illustrating an embodiment of a full functionality set PHY and a reduced functionality set PHY implemented within a WLAN interactive device according to the invention. This embodiment shows, in some greater detail, one manner in which a full functionality set PHY receiver and a reduced functionality set PHY receiver. Both the full functionality set PHY receiver and the reduced functionality set PHY receiver are operable to support received frame identification functionality. This identification of the received frame may be performed within both the full functionality set PHY receiver and the reduced functionality set PHY receiver using the header of the received frame.

However, the full functionality set PHY receiver is operable to support received frame processing functionality to process the received frame. This received frame processing may be performed during a predetermined amount of time. In contrast, the reduced functionality set PHY receiver is operable to support idle state wait functionality to time-out during a time in which another PHY receiver would require to process the received frame. This wait period may last in duration the same predetermined amount of time in which the received frame processing of the full functionality set PHY receiver operates.

Figure 14:
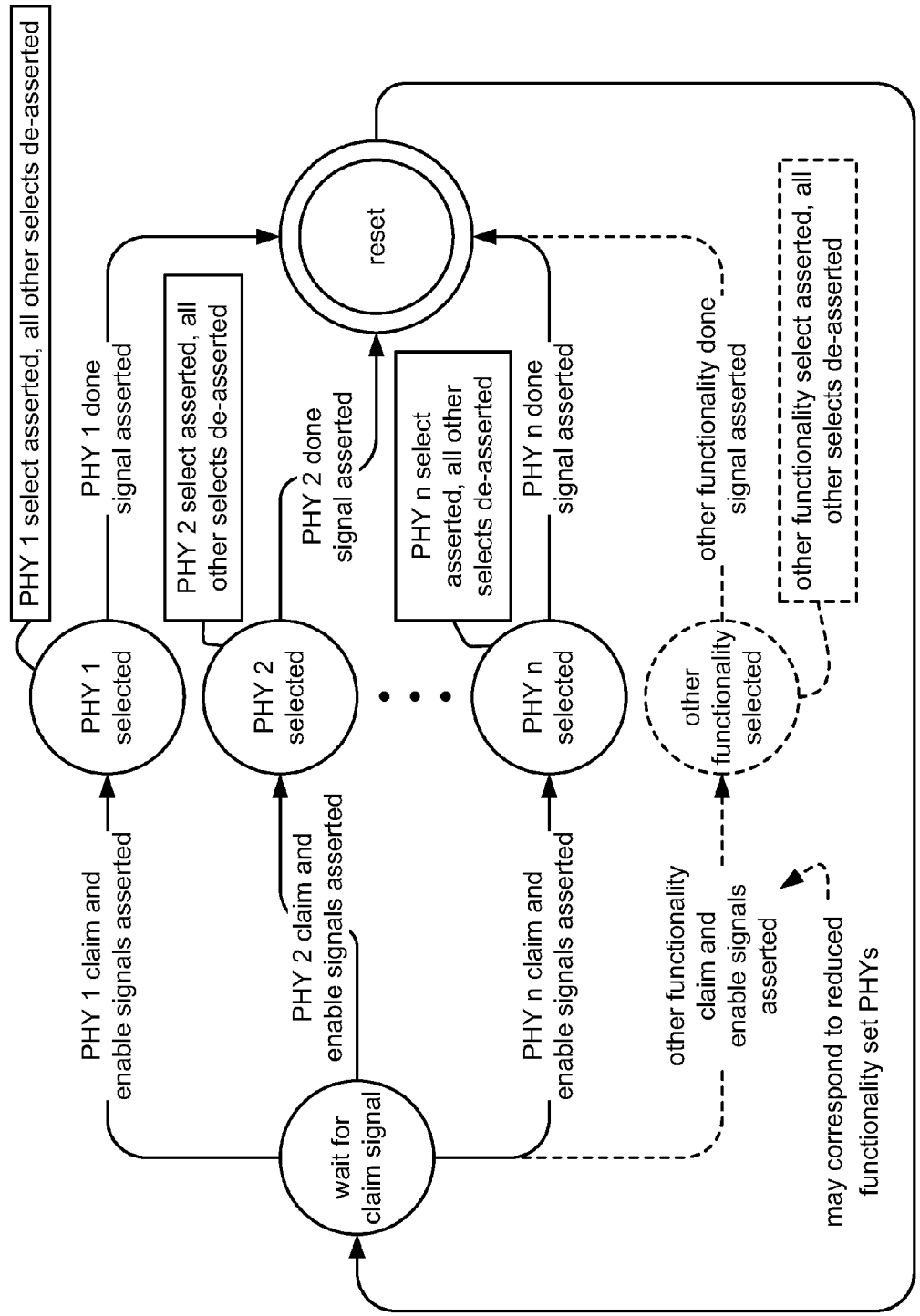
FIG. 14 is a state diagram illustrating an embodiment of how a classifier may operate according to the invention.

FIG. 14 is a state diagram illustrating an embodiment of how a classifier may operate according to the invention. Again, as described above with respect to some of the other embodiments, the operation of a classifier implemented according to the invention may be modeled according to a FSM (Finite State Machine). The operation of this state diagram may be viewed as beginning from the reset state. The operation then proceeds to a wait for claim signal state. The various claim signals are asserted from 1 or more of the various PHY receivers within a WLAN interactive device. When a given PHY receiver asserts a claim signal to the classifier, and that PHY's enable signal is asserted, the state of the classifier moves to the selected state for that particular PHY receiver, and the select signal for that PHY receiver is asserted (e.g., a PHY select signal is asserted for the intended PHY receiver) and the select signals for the other PHY receivers are de-asserted (e.g., a PHY select signals are de-asserted for the non-intended PHY receivers). To allow all PHYs the possibility of processing frames, all PHYs' enable signals are generally asserted. However, in some embodiments, 1 or more of the various PHY receivers may be selectively denied the right to process received frames, by de-asserting the enable signals to 1 or more of the PHY receivers, thus preventing the state of the classifier from entering the selected state of these "disabled" PHYs. When the intended/selected PHY receiver finishes processing the received frame, the intended PHY receiver asserts a PHY done signal to the classifier and the state of the classifier returns to the reset state for subsequent waiting for a claim signal from 1 or more of the other PHY receivers.

For example, when the PHY 1 asserts a claim to the classifier, the state of the classifier moves to the selected state for PHY 1; the inputs to the classifier to make this transition are the asserted PHY 1 claim signal and the PHY 1 enable signal. When the classifier is in this state, the select signal for the PHY 1 is asserted and the select signals for all of the other PHYs are de-asserted (e.g., for a PHY 2, ..., and a PHY n). When the PHY 1 finishes processing the received frame, the PHY 1 asserts a PHY done signal to the classifier and the state of the classifier returns to the reset state for subsequent waiting for a claim signal from 1 or more of the other PHY receivers. The transitions for any of the other PHY receivers (e.g., for a PHY 2, ..., and a PHY n) may also be performed within a similar manner.

It is also noted that the functionality of the classifier may also include functionality beyond the arbitration of claim signals provided by 1 or more of the PHY receivers for the received frame. This may generically be shown as a state of other functionality as being within this embodiment. To transition the classifier into this particular state, a similar operation may be performed as described above with respect to the interaction between the classifier and the various PHY receivers. This other functionality may include energy detection and/or some other functionality as selected by a designer who implements various aspects of the invention.

Figure 15:
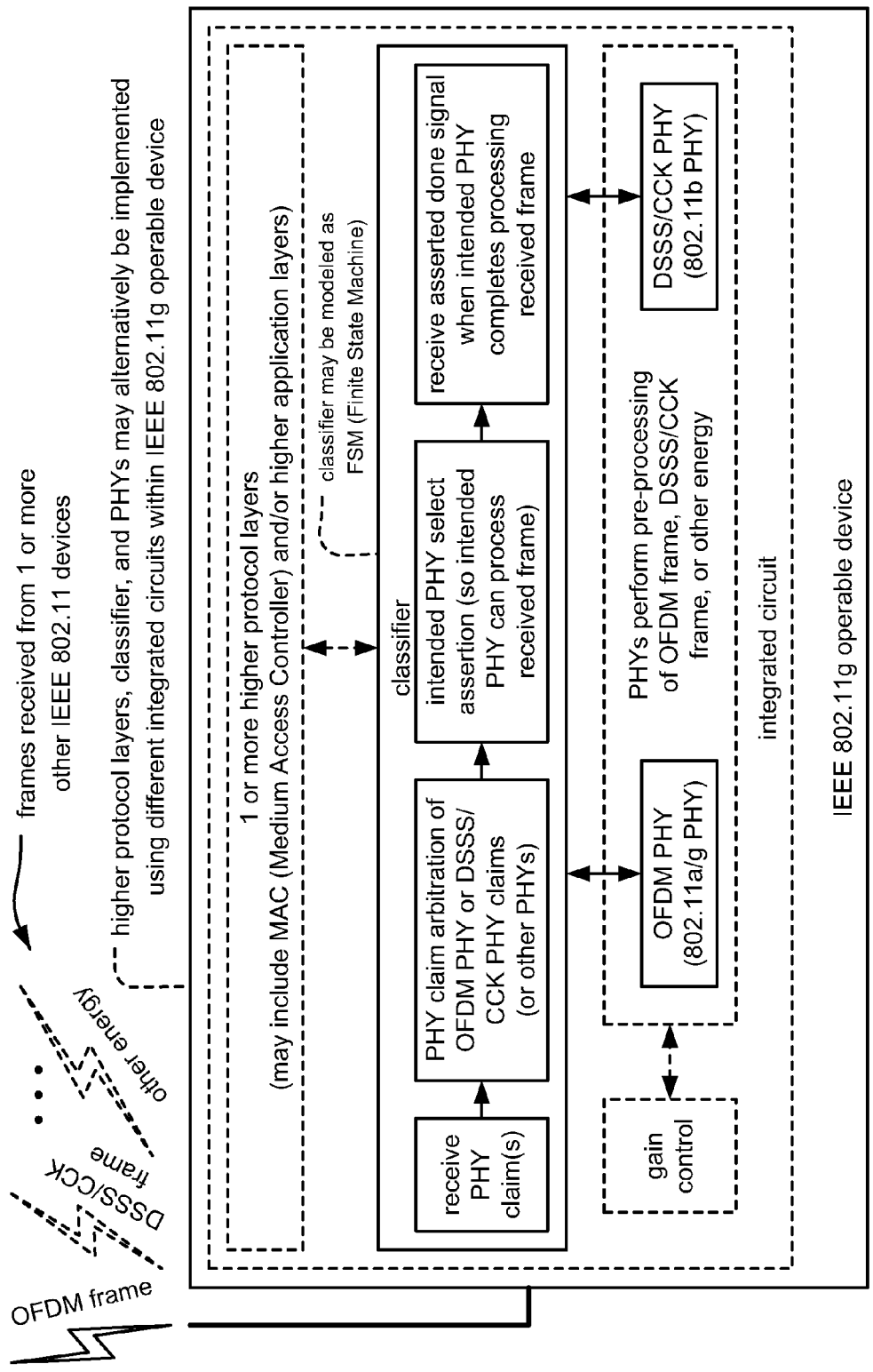
FIG. 15 is a diagram illustrating an embodiment of a PHY (physical layer)/classifier interface within an IEEE (Institute of Electrical & Electronics Engineers) 802.11g operable device that is built according to the invention.

FIG. 15 is a diagram illustrating an embodiment of a PHY (physical layer)/classifier interface within an IEEE (Institute of Electrical & Electronics Engineers) 802.11g operable device that is built according to the invention. The embodiment described within this diagram maybe viewed as being a particular implementation of the WLAN interactive device described above within the FIG. 4.

The IEEE 802.11g operable device includes at least two different PHY receivers: a DSSS/CCK (Direct Sequence Spread Spectrum with Complementary Code Keying) PHY receiver and an OFDM (Orthogonal Frequency Division Multiplexing) PHY receiver. By providing these two separate PHY receivers, the IEEE 802.11g operable device is capable to process received frames that comport with either of the 802.11b or the 802.11g standards. For example, the IEEE 802.11g operable device may employ the DSSS/CCK PHY receiver to process frames that comport with the 802.11b standard (e.g., to process DSSS/CCK frames), and the IEEE 802.11g operable device may employ the OFDM PHY receiver to process frames that comport with the 802.11g standard (e.g., to process OFDM frames). In a more general manner, the IEEE 802.11g operable device may be viewed as including a number of different PHY receivers that is each operable to accommodate the various versions of the 802.11 standard. For example, the IEEE 802.11g operable device may include an 802.11a PHY receiver thereby allowing a single 802.11a/b/g solution that allows the IEEE 802.11g operable device to be implemented in a variety of application contexts including WLANs operating according to the 802.11a standard. This way, a single device, may be designed and employed within either WLANs operating according to the 802.11a standard, or WLANs operating according to the 802.11b standard, or WLANs operating according to the 802.11g standard. In such embodiments, such of these various PHY receivers may be particularly suited to process received frames that comport with that particular amendment to the 802.11 standard.

As with the other embodiment described above, each of these PHY receivers of this IEEE 802.11g operable device is communicatively coupled to a classifier. Also similarly, the classifier of this IEEE 802.11g operable device may be communicatively coupled to 1 or more higher protocol layers such as a MAC and/or 1 or more higher application layers. The IEEE 802.11g operable device includes an antenna that is operable to communicate with the WLAN that may be implemented as an 802.11a WLAN in some instances, an 802.11b WLAN in some other instances, or an 802.11g WLAN in even other instances. It is noted here that the IEEE 802.11g operable device is also backward compatible with the earlier amendments to the 802.11 standard including the 802.11b standard.

The various types of frames that may be received by the IEEE 802.11g operable device include DSSS/CCK frames and OFDM frames. These DSSS/CCK frames and OFDM frames may be transmitted to the IEEE 802.11g operable device from 1 or more other WLAN interactive devices including other IEEE 802.11g operable devices.

After the frame is received by the IEEE 802.11g operable device, the various PHY receivers perform pre-processing of the received frame to calculate confidence levels that are used to perform the classification of the received frame. In some instances, the DSSS/CCK PHY receiver performs correlation processing using the received frame and a known spreading sequence of a DSSS/CCK frame, and the OFDM PHY receiver performs correlation processing using the received frame and a delayed copy of the received frame. These correlations may be used to determine confidence levels in some embodiments, and these correlations may be compared to respective thresholds within the corresponding PHY receiver to determine whether the DSSS/CCK PHY receiver or the OFDM PHY receiver (or any of the other PHY receivers) is to assert a claim to the classifier. It is also noted here that the thresholds may be predetermined, adaptively modified according to the operating conditions of the WLAN, and they may be individually tuned for each of the various PHY receivers (e.g., for each of the DSSS/CCK PHY receiver and the OFDM PHY receiver). There may be instances where more than 1 PHY receiver asserts a claim to the classifier. In addition, there may be instances in which the confidence levels (or correlations as described in this embodiment) calculated by more than 1 PHY receiver may be of comparable values.

In some instances, the classifier may be implemented to employ both the claims and their corresponding confidence level information in performing the arbitration among multiple claims. A designer of such an IEEE 802.11g operable device may select the particular tie-breaking approaches/arbitration rules that are employed to arbitrate between competing claims and select a winning PHY receiver.

After the classifier arbitrates between any competing claims, the classifier then provides (or interfaces) a PHY select signal to the intended PHY receiver. Thereafter, the intended PHY receiver processes the received frame. It is also noted that two-fold gain control functionality may also be supported within the IEEE 802.11g operable device: coarse gain control during pre-processing of the received frame by all of the PHY receivers and fine gain control during the actual processing of the received frame by the intended PHY receiver. For example, during the actual processing of the received frame, this gain control functionality may perform gain control to the received frame thereby scaling the received frame to a range that is appropriate for the intended PHY receiver that in fact processes the received frame. For example, the DSSS/CCK PHY receiver and the OFDM PHY receiver may each expect to receive signals having different dynamic ranges or the actual PHY receivers themselves have different characteristics (e.g., different operational dynamic ranges). In addition, the DSSS/CCK PHY receiver and the OFDM PHY receiver may each expect to receive signals having different peak to average ratios. More specifically, the DSSS/CCK PHY receiver may expect to receive signals whose average power is substantially close to the maximum power of the signal, and the OFDM PHY receiver may expect to receive signals having relatively larger peaks when compared to the average of those signals. Such operational parameters or characteristics of the types of signals that each of the PHY receivers may expect to receive may be yet other operational consideration that warrants different types of gain control to be performed for received frames thereby scaling the received frames to ranges that are more appropriate for the intended PHY receiver.

After the classifier has determined by which PHY receiver the received frame is to be processed, the gain control functionality may then ensure that the received frame is scaled to a range that is appropriate for that particular PHY receiver. Again, as described within other embodiments, the gain control functionality may direct a relatively "dumb" device (such as an RF front-end) to perform the scaling of the received frame.

After the intended PHY receiver fully processes the received frame, the intended PHY receiver asserts a PHY done signal to the classifier notifying the classifier that the intended PHY receiver has finished its processing of the received frame.

As with the other embodiments described above, there may also be instances where the received frame is in fact not intended for any of the various PHY receivers within the IEEE 802.11g operable device. In such instance, however, the IEEE 802.11g operable device may include 1 or more reduced functionality set PHY receivers that is operable to determine that the received frame is intended for a type of PHY receiver that is not included within the IEEE 802.11g operable device.

Alternatively, the IEEE 802.11g operable device may detect the existence of some energy within the WLAN (e.g., detect a corresponding energy of a received frame). If desired, the OFDM PHY receiver may be implemented to perform such energy detection.

In such instances, given that there is in fact some energy within the WLAN, the IEEE 802.11g operable device may time-out for a period of time (e.g., not allow transmission or receipt of any frames to the IEEE 802.11g operable device during that time) or monitor that existent energy and wait until it dissipates. This way, the IEEE 802.11g operable device will not interfere with another WLAN interactive device (such as another IEEE 802.11g operable device) for which that existent energy may have been intended. The IEEE 802.11g operable device may employ energy detection functionality alone or in conjunction with some other higher level functionality such as confidence level consideration functionality (or correlation level consideration functionality) when determining whether or not the received frame is intended for the IEEE 802.11g operable device as well as determining whether or not to enter into a time-out period (that allows not transmission or receipt of frames).

Again, as with the other embodiments describe above, it is also noted that the classifier and the various PHY receivers, as well as any higher protocol layers may be implemented within IEEE 802.11g operable device in a variety of different ways. One or more integrated circuits may be implemented to support the functionality of all of these various functional blocks (e.g., the PHY receivers, the classifier, and any higher protocol layers). All of these functional blocks may be implemented within a single integrated circuit; alternatively, they may be implemented within different integrated circuits.

Figure 16:
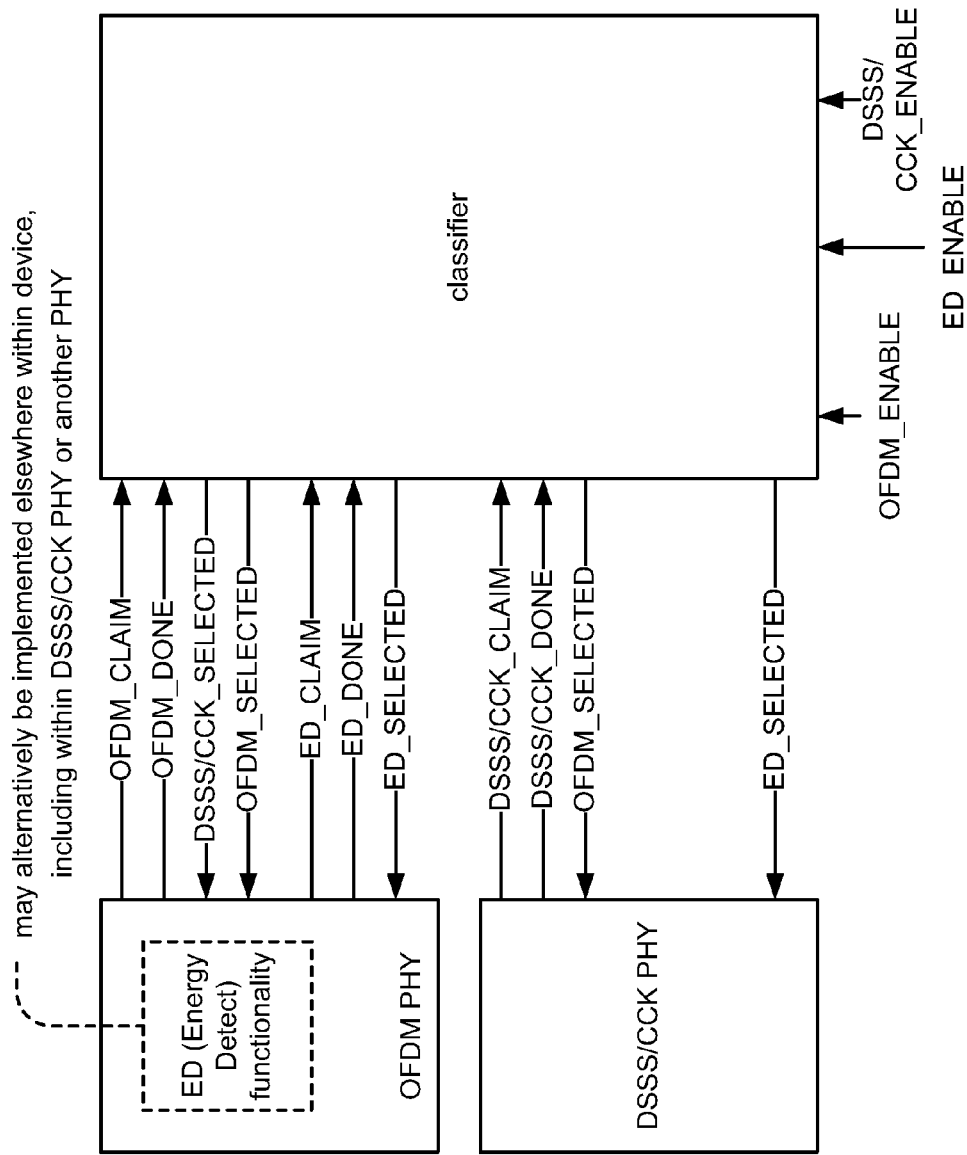
FIG. 16 is a diagram illustrating another embodiment of a PHY/classifier interface for an IEEE 802.11g operable device that is built according to the invention.

FIG. 16 is a diagram illustrating another embodiment of a PHY/classifier interface for an IEEE 802.11g operable device that is built according to the invention. This particular embodiment shows how a classifier may be implemented to work in conjunction with a two PHY receivers: one PHY receiver for OFDM packets (shown as an OFDM PHY) and one PHY for DSSS/CCK packets (shown as a DSSS/CCK PHY). The OFDM PHY receiver and the DSSS/CCK PHY receiver may share components but, for simplicity in this example, are shown to be separate functional blocks.

An OFDM_CLAIM and an OFDM_DONE signal are shown as inputs to the classifier from the OFDM PHY. Similarly, DSSS/CCK_CLAIM and DSSS/CCK_DONE signals are shown as inputs to the classifier from the DSSS/CCK PHY. There are also ED_CLAIM and ED_DONE signals that are inputs to the classifier for the processing of a non-packet/non-received frame ED (Energy Detection) component at the receiver. In this example, the OFDM PHY controls the processing of non-packet energy and is, therefore, the functional block that generates these signals. The other classifier inputs, OFDM_ENABLE, DSSS/CCK_ENABLE, and ED_ENABLE, are control signals that allow the selective classification of each type of energy. The classifier output signals, OFDM_SELECTED, DSSS/CCK_SELECTED, and ED_SELECTED, are inputs to the various PHYs. The inputs and outputs are logic signals, and their behavior may be described as with respect to the classifier state diagram of the following FIG. 14.

Figure 17:
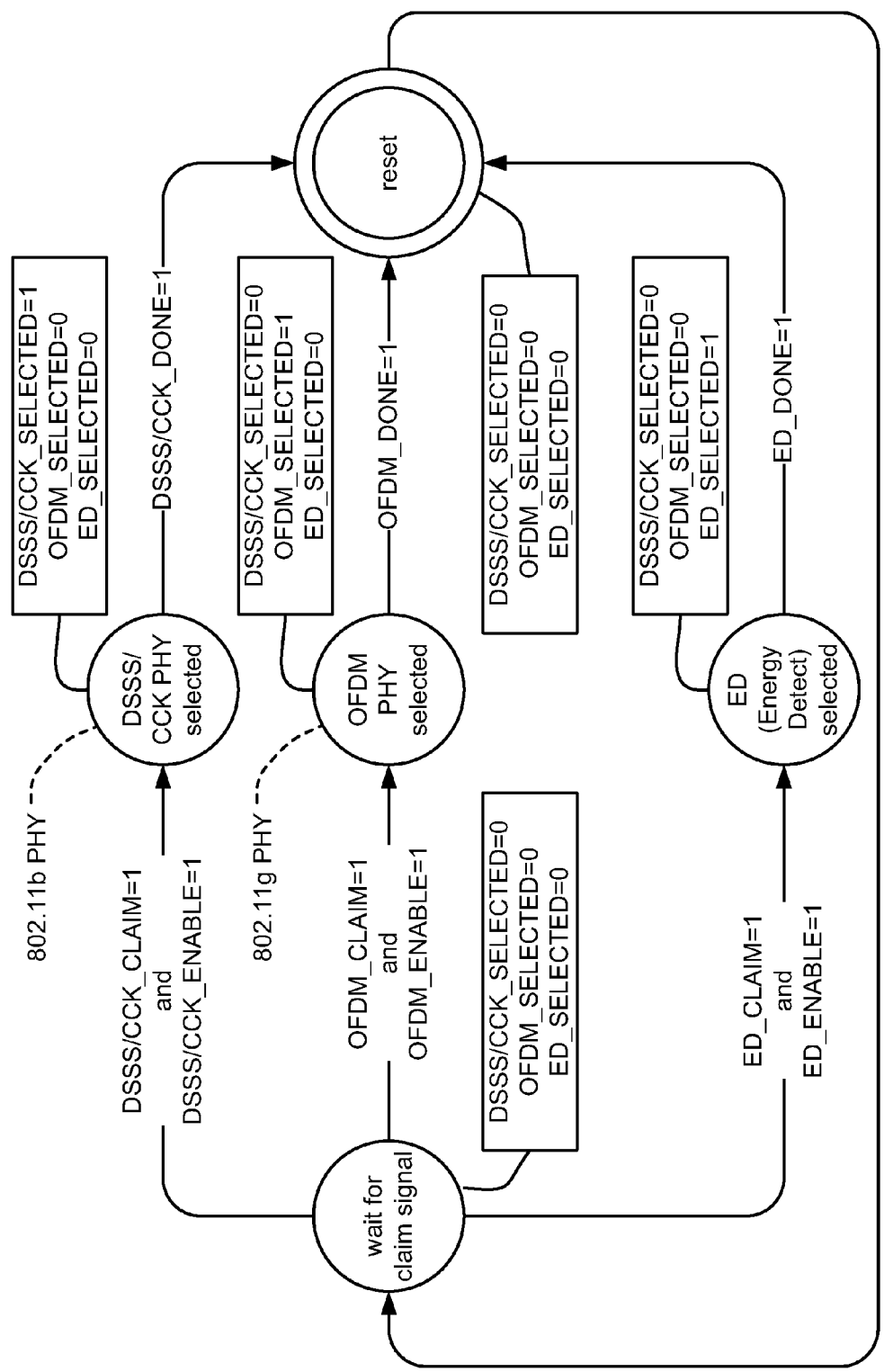
FIG. 17 is a diagram illustrating an embodiment of a classifier state diagram for an IEEE 802.11g operable device that operates according to the invention.

FIG. 17 is a diagram illustrating an embodiment of a classifier state diagram for an IEEE 802.11g operable device that operates according to the invention. Again, the operation of the classifier of a PHY/classifier interface within this embodiment, as within other embodiments, may be modeled as a FSM (Finite State Machine). Within this state diagram, states are depicted as circles and arrows represent allowable transitions between the various states within the classifier. The descriptions within the state transitions indicate the conditions required for those particular transitions.

The box adjacent to a state, connected via a line, lists the value that the classifier outputs for that particular state. In this particular embodiment, there is a WAITING_FOR_CLAIM state (wait for claim signal state), a state for each possible energy type (such a DSSS/CCK energy type and an OFDM energy type), and a RESET state. While in the RESET state, the classifier outputs are all forced to 0, and the classifier itself cannot distinguish energy of any type. From the RESET state, the classifier transitions to the WAITING_FOR_CLAIM state. While in this state, the various PHYs within the device search the received energy for the presence of a packet; this may be characterized as the pre-processing describe herein.

More specifically, the DSSS/CCK PHY computes the correlation of the received signal (e.g., a received frame) with the known spreading sequence of a DSSS/CCK frame. At the same time, the OFDM PHY computes the correlation of the received signal (e.g., the received frame) with itself delayed by one period of the OFDM short training sequence. If the DSSS/CCK correlation exceeds a certain threshold (chosen by the designer), the DSSS/CCK PHY asserts a DSSS/CCK_CLAIM signal to the classifier. The DSSS/CCK_ENABLE input to the classifier acts as a switch that enables or disables the classification of the received signal as a DSSS/CCK packet.

If the DSSS/CCK_ENABLE input is set to 0, transitions into the DSSS/CCK_SELECTED state are not allowed, and the DSSS/CCK_CLAIM is ignored. If the value of the DSSS/CCK_ENABLE input is 1, the classifier will transition to the DSSS/CCK_SELECTED state and assert its DSSS/CCK_SELECTED signal when a DSSS/CCK_CLAIM is seen. The assertion of the DSSS/CCK_SELECTED output forces the OFDM PHY to be held in an idle state while the DSSS/CCK PHY processes the signal. Once the DSSS/CCK PHY has finished processing the signal, it asserts a DSSS/CCK_ DONE signal to the classifier. The classifier transitions into the RESET state, deasserts the DSSS/CCK_SELECTED signal, and reenters the WAITING_FOR_CLAIM state for the processing of subsequent received signals (e.g., subsequent received frames).

The sequence of transitions for an OFDM packet is similar to the sequence of transitions for a DSSS/CCK packet. If the OFDM correlation described exceeds a design threshold (chosen by the designer), the OFDM PHY asserts an OFDM_CLAIM signal to the classifier. If value of the OFDM_ENABLE signal is 1, an OFDM_CLAIM provided by the OFDM PHY causes the classifier to transition to the OFDM_SELECTED state and assert the OFDM_SELECTED signal. While the classifier is in the OFDM_SELECTED state, the DSSS/CCK PHY remains idle. The classifier does not exit the OFDM_SELECTED state until it receives an OFDM_DONE signal from the OFDM PHY. Then, the classifier passes through the RESET state in order to clear all of the classifier outputs, returns to the WAITING_FOR_CLAIM state, and waits for the next packet.

In addition to searching for a packet, the receiver monitors the power at its input. When the received input power exceeds a threshold, the OFDM and DSSS/CCK PHYs are given an amount of time to assert a claim. If neither PHY claims the energy, an ED_CLAIM is asserted to notify the classifier of a non-packet ED (Energy Detect). The classifier behavior for non-packet energy is analogous to that for a PHY claimed packet/PHY claimed received frame. If ED_ENABLED is 1, the classifier enters the ED_SELECTED state and asserts its ED_SELECTED output. Once the input power drops sufficiently (e.g., dissipates), or after a particular period of time, an ED_DONE signal is asserted and the classifier passes through the RESET state and returns to the WAITING_FOR_CLAIM state. The power thresholds, the amount of time to wait for a claim, the period of time to time-out, as well as any other implementation parameters may be chosen by a designer implementing such aspects of the invention. In this embodiment, the OFDM PHY controls the ED_CLAIM and ED_DONE signals. This is because the receiver components used to measure input power are contained in the OFDM PHY as shown as ED (Energy Detect) functionality. However, other implementations may choose to have these components elsewhere in the receiver, including inside the DSSS/CCK PHY or within other PHYs.

Because there may sometimes be competing claim signals provided from the various PHYs, tie-breaking procedures (e.g., arbitration rules) may be implemented to handle claims that may arrive at the classifier at substantially the same time, within a particular period of time. In addition, certain embodiments may also employ tie-breaking procedures (e.g., arbitration rules) that include information corresponding not only to claims but also to confidence levels associated with those claims or for confidence levels provided from all of the PHY receivers. As an example of one way in which the arbitration rules may be implemented, the OFDM_CLAIM is given priority over the ED_CLAIM in one embodiment, and the DSSS/CCK_CLAIM is given priority over both of the other claims. Other implementations of a classifier may be implemented to perform different tie-breaking procedures/arbitration rules as desired within a particular embodiment.

Figure 18:
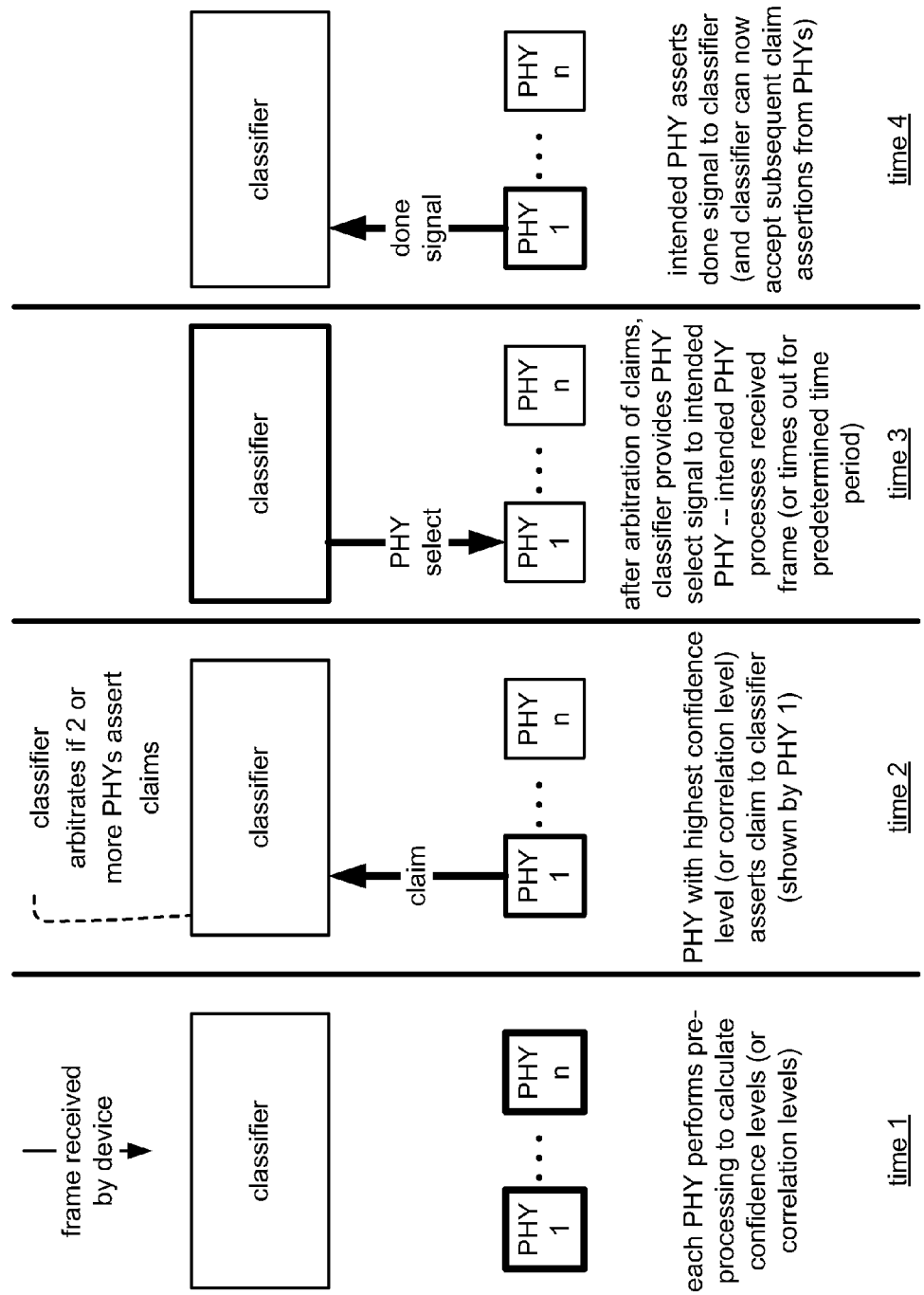
FIG. 18 is a diagram illustrating an embodiment of PHY/classifier interface interaction as a function of time according to the invention.

FIG. 18 is a diagram illustrating an embodiment of PHY/classifier interface interaction as a function of time according to the invention. Initially, as shown at a time 1, a frame is received by a device. Each PHY receiver of the device performs pre-processing to calculate confidence levels (or correlation levels) to determine whether the received frame is intended for that particular PHY receiver.

Then, as shown at a time 2, those PHY receivers whose corresponding confidence level exceeds a threshold for that corresponding PHY receiver assert a claim to the classifier. Multiple PHY receivers may assert a claim to the classifier. This embodiment shows PHY 1 as being the only PHY receiver that asserts a claim, but clearly, other PHY receivers may also assert a claim to the classifier.

The classifier is operable to arbitrate between multiple claims if 2 or more PHY receivers assert claims to the classifier. The classifier is operable to prioritize the various claims that may be received by the classifier at substantially the same time or substantially within the same period of time.

Then, as shown at a time 3, the classifier then provided a PHY select signal to the appropriate PHY receiver for which the received frame is intended. The PHY select signal is provided to the intended PHY receiver. The intended PHY receiver then processes the received frame.

Then, as shown at a time 4, after the intended PHY receiver finishes processing the received frame, the intended PHY receiver then asserts a PHY done signal to the classifier, and the classifier is then able to receive subsequent claim assertions from the various PHY receivers within the device.

Figure 19:
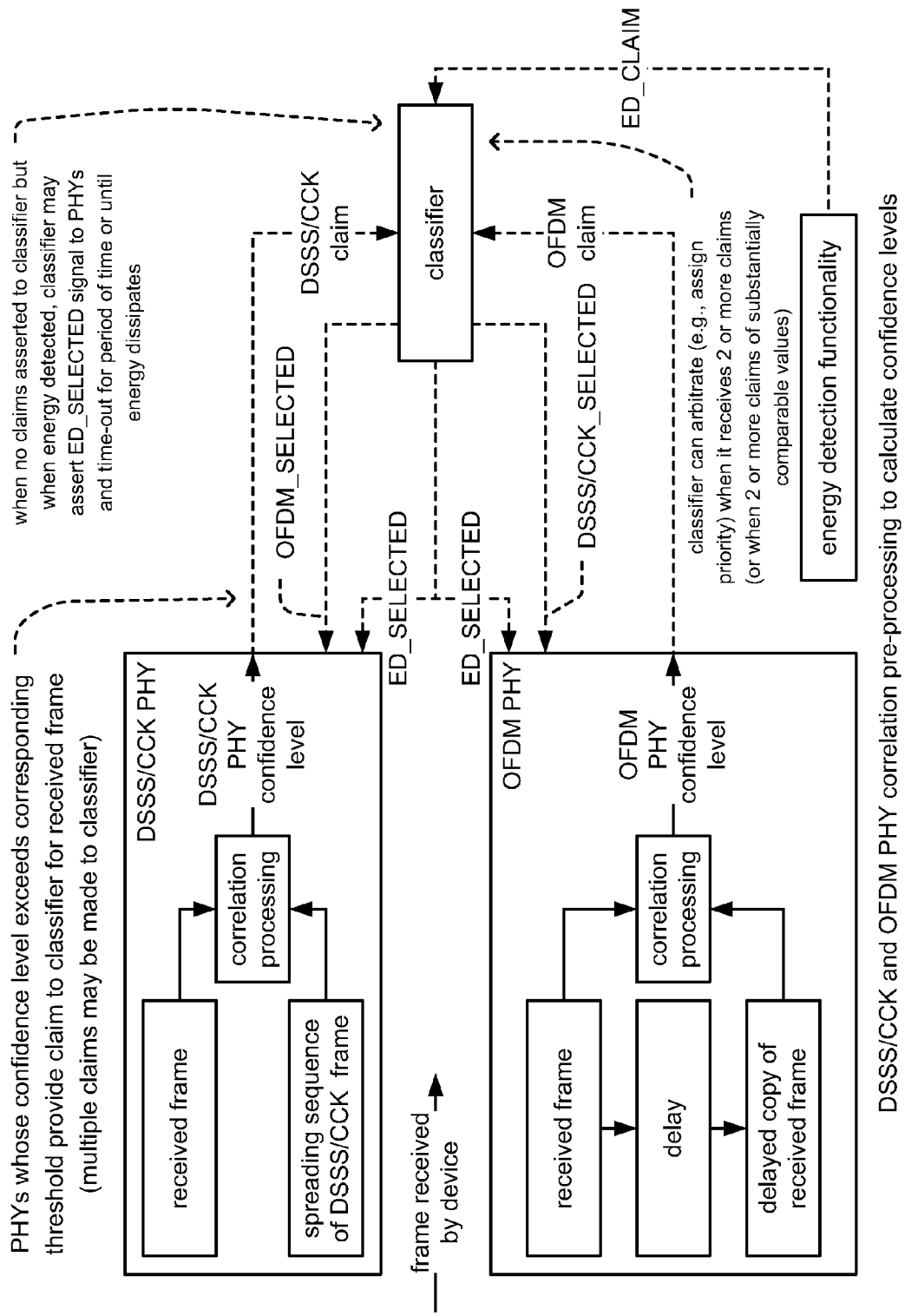
FIG. 19 is a diagram illustrating an embodiment of DSSS/CCK (Direct Sequence Spread Spectrum with Complementary Code Keying) and OFDM (Orthogonal Frequency Division Multiplexing) correlation pre-processing, within a DSSS/CCK PHY receiver and an OFDM PHY receiver, respectively, to calculate confidence levels according to the invention.

FIG. 19 is a diagram illustrating an embodiment of DSSS/CCK (Direct Sequence Spread Spectrum with Complementary Code Keying) and OFDM (Orthogonal Frequency Division Multiplexing) correlation pre-processing, within a DSSS/CCK PHY receiver and an OFDM PHY receiver, respectively, to calculate confidence levels that are employed to determine whether or not to assert a claim to the classifier according to the invention.

This diagram graphically illustrates how a DSSS/CCK PHY and an OFDM PHY may calculate their respective correlations for a received frame that are used to determine whether or not to assert a claim. A DSSS/CCK PHY computes the correlation of the received signal with the known spreading sequence of a DSSS/CCK frame. The received frame and the known spreading sequence of a DSSS/CCK frame are provided to a correlation processing functional block where a DSSS/CCK PHY confidence level is output that is associated with the correlation value that is calculated within the DSSS/CCK PHY.

At the same time, the OFDM PHY computes the correlation of the received signal with itself delayed by one period of the OFDM short training sequence. The received frame is provided to a correlation processing functional block, and the received frame is also provided to a delay block thereby generating a delayed copy of the received frame. The delayed copy of the received frame, as well as the received frame, are both provided to the correlation processing functional block where an OFDM PHY confidence level is output that is associated with the correlation value that is calculated within the OFDM PHY.

If the DSSS/CCK confidence level exceeds a certain threshold (chosen by the designer), the DSSS/CCK PHY asserts a claim signal to a classifier. In addition, if the OFDM confidence level exceeds a certain threshold (chosen by the designer), the OFDM PHY also asserts a claim signal to a classifier.

There may also be instances where the associated confidence levels are also provided to the classifier in conjunction with the asserted claims. If desired, the confidence levels from all of the PHY receivers may be provided to the classifier from only the PHY receivers that assert claims. In addition, the confidence levels from all of the PHY receivers may be always provided to the classifier from all of the PHY receivers.

As with other embodiments, the classifier is able to arbitrate any competing claims that may be provided by both the DSSS/CCK PHY and the OFDM PHY. When no affirmative claim is asserted to the classifier from any of the PHY receivers, but when energy is in fact existent within the WLAN, the classifier may receive an ED (Energy Detect) claim indicating that the energy in existent within the WLAN. In response to the ED claim, the classifier may assert an ED select signal to the DSSS/CCK PHY and also to the OFDM PHY. In such instances, the classifier directs all of the PHY receivers to time-out for a predetermined period of time or until the energy dissipates.

Figure 20A:
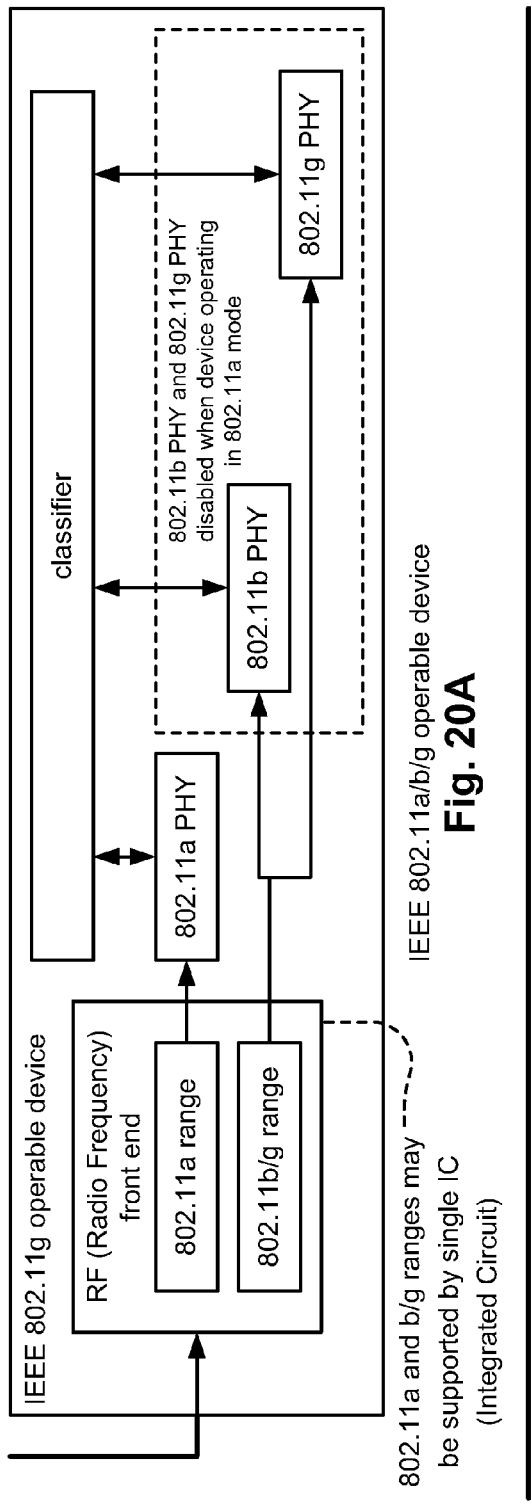
FIG. 20A and FIG. 20B are diagrams illustrating embodiments of IEEE 802.11a/b/g operable devices that may be designed according to the invention.
Figure 20B:
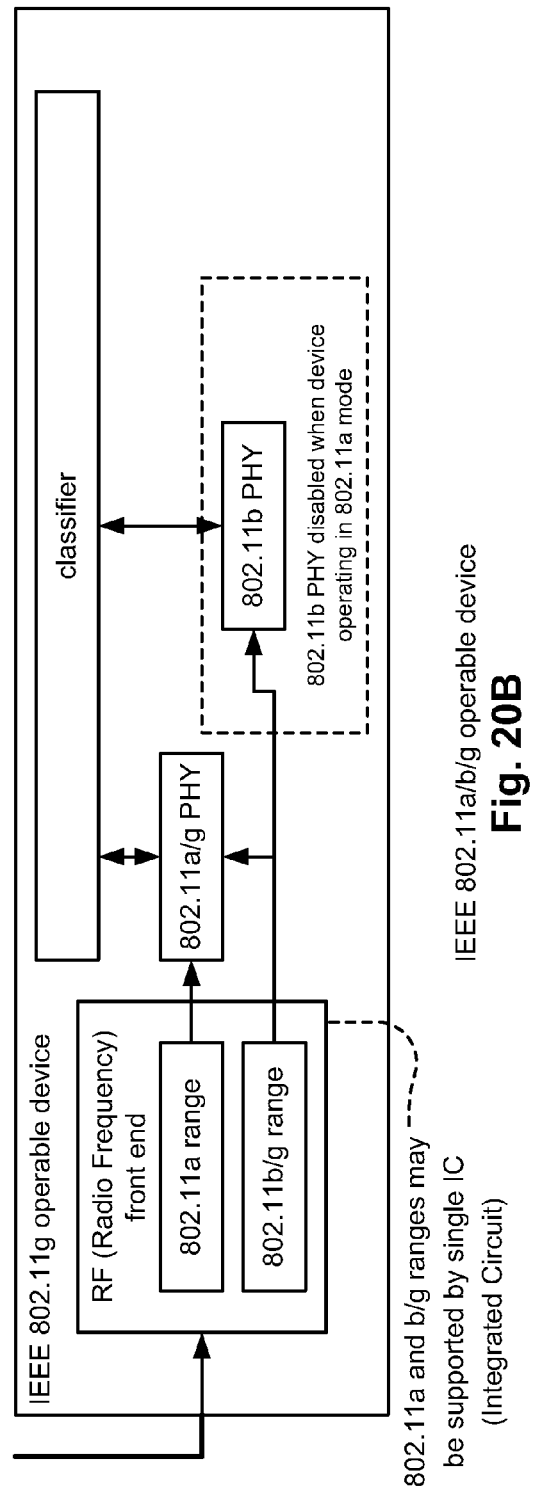

FIG. 20A and FIG. 20B are diagrams illustrating embodiments of IEEE 802.11a/b/g operable devices that may be designed according to the invention. These embodiments show how a single device may be designed to operate within various WLANs including any one of an 802.11a WLAN, an 802.1b WLAN, an 802.11g WLAN, or an 802.11b/g WLAN.

Referring to the FIG. 20A, a 802.11a/b/g operable device includes a common RF (Radio Frequency) front-end is communicatively coupled to each of a 802.11a PHY receiver, a 802.11b PHY receiver, and a 802.11g PHY receiver. More specifically, the RF front-end is functionally partitioned into a functional portion appropriate for the 802.11a range and also into a functional portion appropriate for the 802.11b/g range. The 802.11a range is within the frequency range between approximately 4.9 GHz (Giga-Hertz) and 5.8 GHz. The 802.11b range is within the frequency range between approximately 2.41 GHz and 2.47 GHz. The 802.11g range is also within the frequency range between approximately 2.41 GHz and 2.47 GHz. The functionally partitioned RF front-end may be implemented as two separate integrated circuits or as separate functional blocks within a single integrated circuit.

When the 802.11a/b/g operable device is operating within an 802.11a WLAN, the 802.11b PHY receiver and the 802.11g PHY receiver operable portions are disabled. Similarly, when the 802.11a/b/g operable device is operating within either an 802.11b WLAN or an 802.11g WLAN, the 802.11a PHY receiver operable portions are disabled.

Referring to the FIG. 20B, this embodiment is similar to the embodiment of the FIG. 20A with the exception that the 802.11a PHY receiver and the 802.11g PHY receiver are both implemented using the same functional block. Because both the 802.11a and the 802.11g standards operate using OFDM, the same functional block may be employed to support the processing of received frames for both standards beyond the RF front-end.

FIG. 21, FIG. 22, FIG. 23, and FIG. 24 are flowcharts illustrating different embodiments of classification methods that are performed according to the invention.

Figure 21:
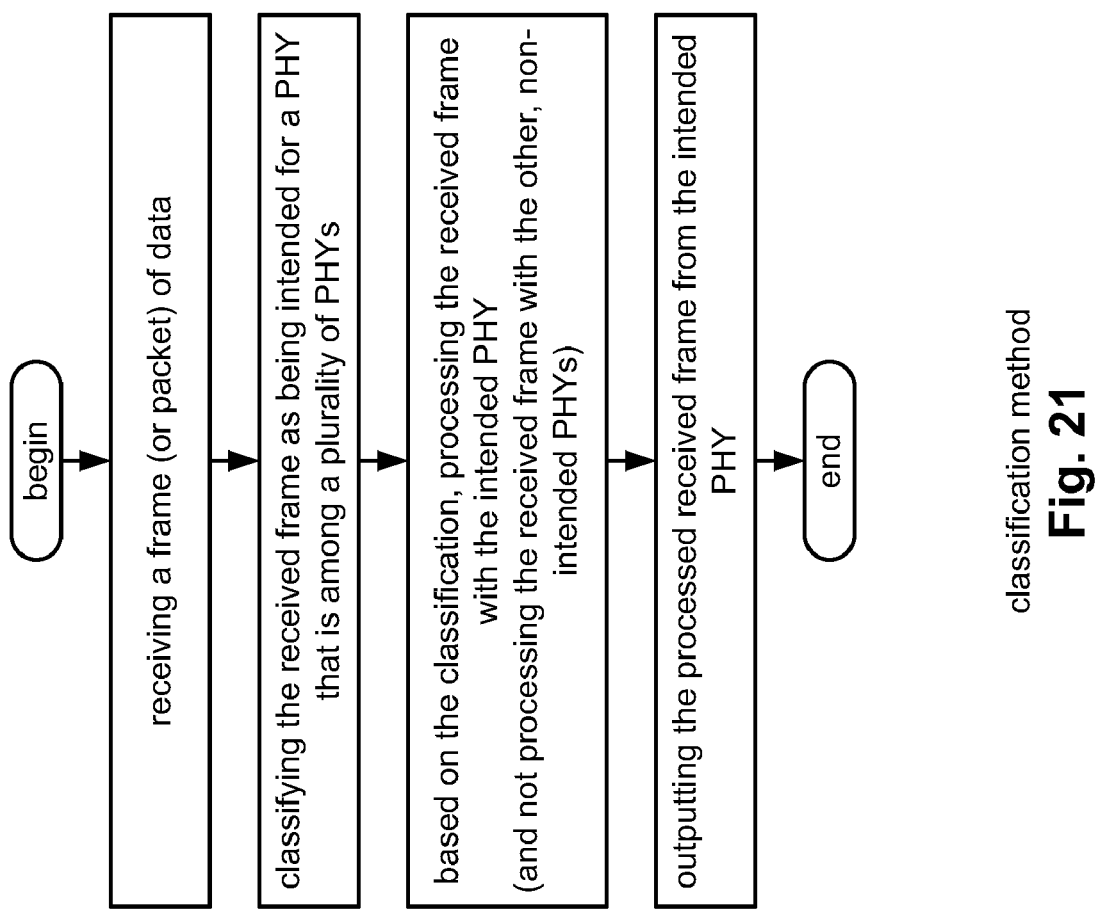
FIG. 21, FIG. 22, FIG. 23, and FIG. 24 are flowcharts illustrating different embodiments of classification methods that are performed according to the invention.

Referring to the FIG. 21, the method begins by receiving a frame (or packet) of data. The method then continues by classifying the received frame as being intended for a PHY receiver that is among a plurality of PHY receivers. Then, based on the classification, the method continues by processing the received frame with the intended PHY receiver. In addition, the method also involves not processing the received frame using the other PHY receivers that are not selected as the intended PHY receiver. The method then involves outputting the processed received frame only from the intended PHY receiver that actually performs the processing of the received frame.

Figure 22:
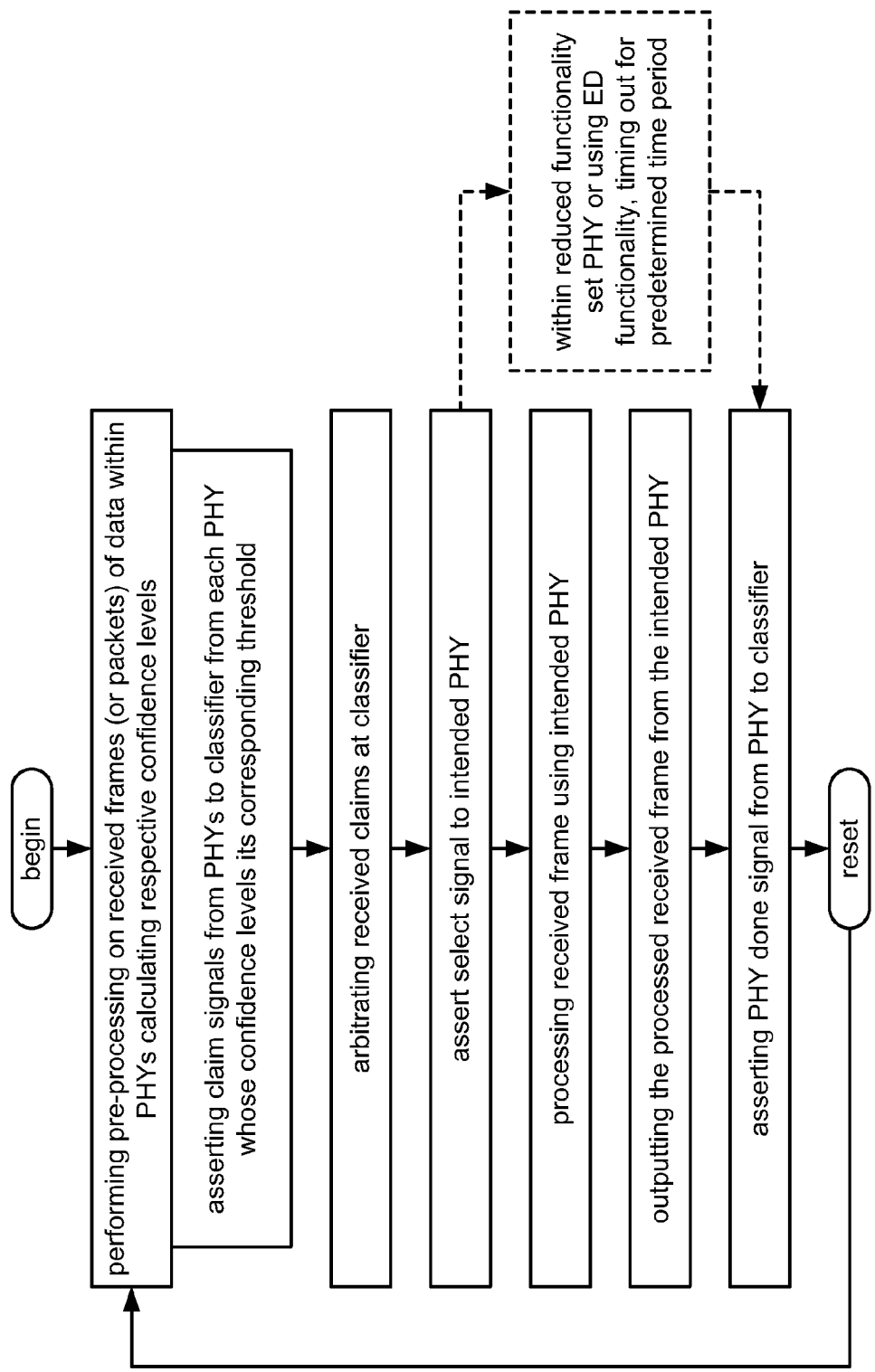

Referring to the FIG. 22, this method involves performing pre-processing on received frames (or packets) of data within each PHY receiver of a device thereby calculating respective confidence levels. For each of the PHY receivers, when its corresponding confidence level exceeds its corresponding threshold, that PHY receiver asserts a claim signal from that PHY receiver to the classifier. Again, multiple claims may be asserted to the classifier from various PHY receivers.

When multiple claims are asserted, then the method involves arbitrating the received claims. After a winner has been selected among all of the asserted claims, the method involves asserting a select signal to the intended PHY receiver that may be viewed as granting the intended PHY receiver the right to process the received frame. The method then involves processing the received frame using the intended PHY receiver. Afterwards, the method also involves outputting the processed received frame from the intended PHY receiver after the intended PHY receiver finishes processing the received frame. After the intended PHY finishes processed the received frame, the method involves asserting a PHY done signal from the PHY to a classifier.

The method then involves resetting and then performing pre-processing on a subsequently received frame (or packet) of data within each PHY receiver of a device thereby calculating respective confidence levels.

In some embodiments, the method does not involve actually processing the received frame using the intended PHY receiver. Instead, within a reduced functionality set PHY receiver or within a device employing ED functionality, the method involves timing out for a predetermined period of time. This predetermined period of time may be the same time period that each of the various PHY receivers requires to complete processing of a received frame.

Figure 23:
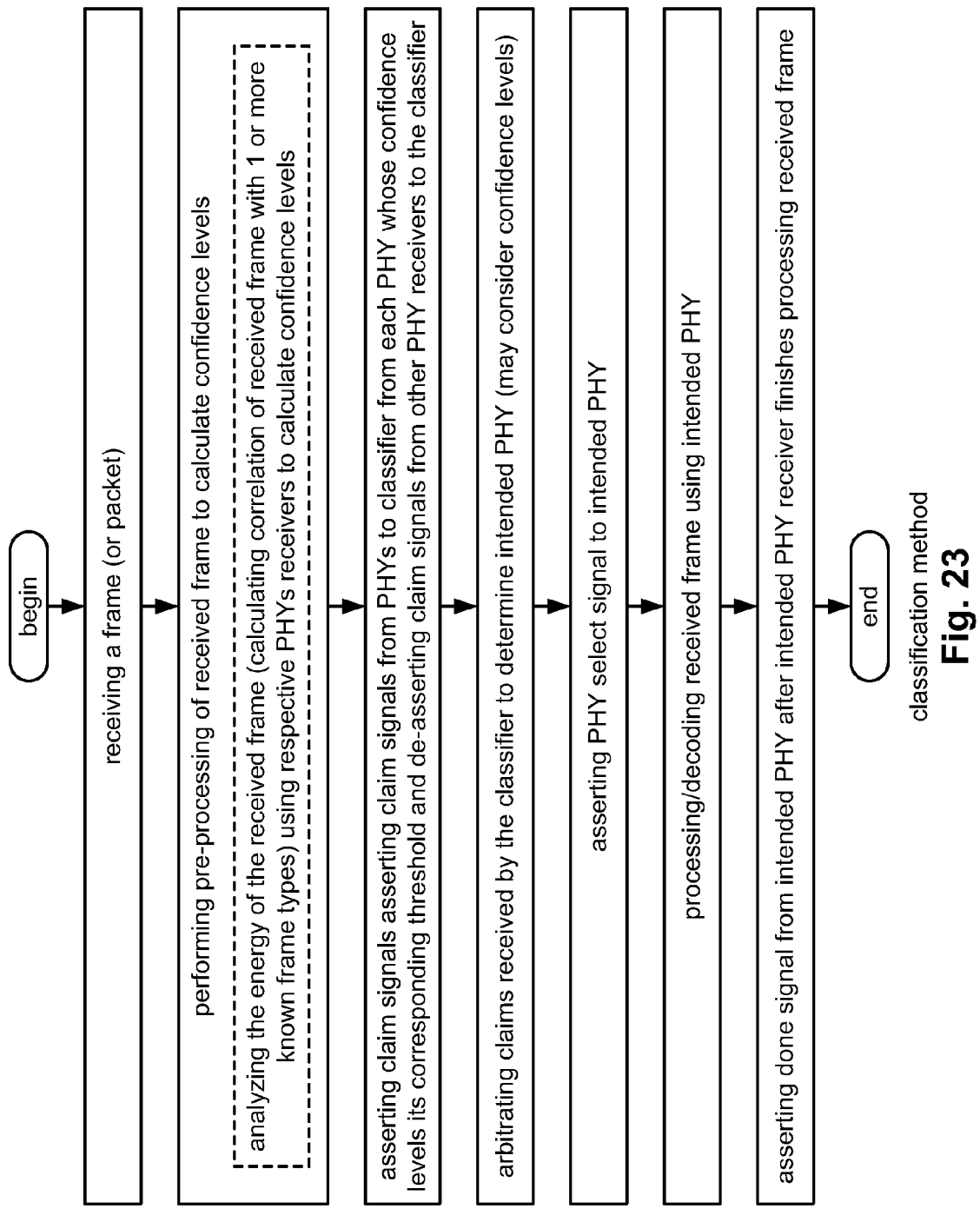

Referring to the FIG. 23, the method of this embodiment operates by receiving a frame (or packet). Then, the method continues by performing pre-processing of received frame to calculate confidence levels. This calculation of the confidence levels of the may be performed by analyzing the energy of the received frame (e.g., calculating correlation of received frame with 1 or more known frame types) using the respective PHYs receivers (e.g., PHY 1, PHY 2, PHY 3, . . . , and PHY n) to calculate confidence levels. For example, this may be performed using correlation processing of the received frame to help identify it as comporting with one particular type of standard or as being intended for one particular type of PHY receiver.

For each of the PHY receivers for which its confidence level exceeds its respective threshold, the method involves asserting a claim signal from that PHY receiver to the classifier. In addition, the method also involves de-asserting claim signals from other PHY receivers to the classifier.

The method also involves arbitrating among multiple claims that may be received. After a winning PHY receiver has been selected, the method involves asserting a PHY select signal to the intended PHY thereby granting the intended PHY receiver the right to process the received frame.

The method then continues by processing/decoding received frame using the intended PHY receiver. After the processing of the PHY receiver has been completed, the method then continues by asserting a done signal from the intended PHY receiver.

Figure 24:
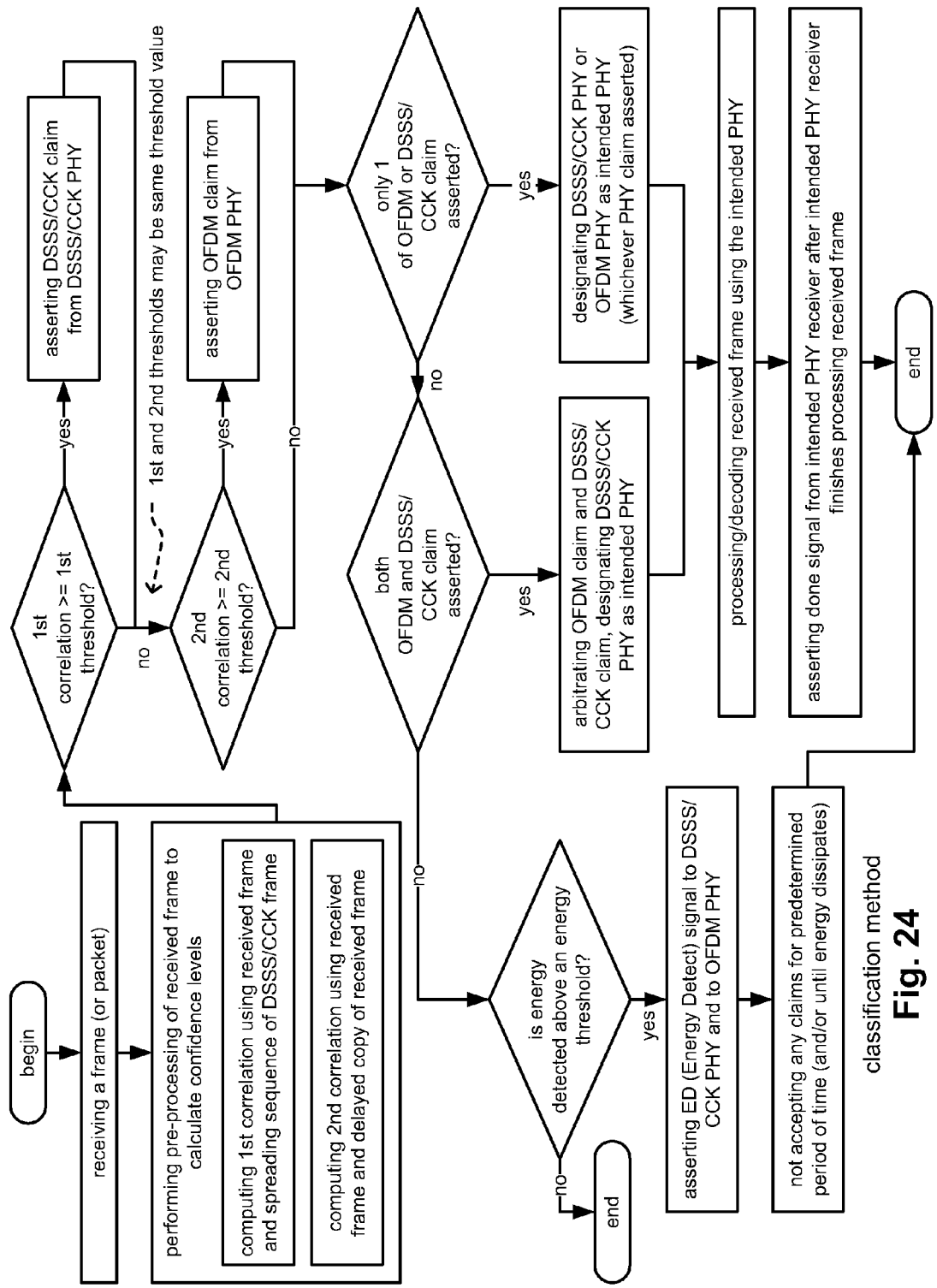

Referring to the FIG. 24, the method of this embodiment operates by receiving a frame (or packet). Then, the method continues by performing pre-processing of received frame to calculate confidence levels. This pre-processing may be performed by computing a $1^{st}$ correlation using the received frame and a known spreading sequence of a DSSS/CCK frame. In addition, this pre-processing may be performed by computing a $2^{nd}$ correlation using the received frame and a delayed copy of received frame.

Then, the method determines whether the $1^{st}$ correlation exceeds or is equal to a $1^{st}$ threshold. If the $1^{st}$ correlation exceeds or is equal to the $1^{st}$ threshold, then the method continues by asserting a DSSS/CCK claim from a DSSS/CCK PHY. In addition, the method also determines whether the $2^{nd}$ correlation exceeds or is equal to the $2^{nd}$ threshold. If the $2^{nd}$ correlation exceeds or is equal to the $2^{nd}$ threshold, then the method continues by asserting an OFDM claim from an OFDM PHY.

The method then determines whether only 1 claim of the 2 claim types of the DSSS/CCK claim or the OFDM claim is asserted. If only 1 claim (either the DSSS/CCK claim or the OFDM claim) is asserted, then that particular PHY receiver is designated as the intended PHY receiver. For example, if only the DSSS/CCK claim is asserted, then the DSSS/CCK PHY receiver is designated as the intended PHY receiver. Alternatively, if only the OFDM claim is asserted, then the OFDM PHY receiver is designated as the intended PHY receiver.

Then, after an appropriate PHY receiver has been designated as the intended PHY receiver, method then continues along this path by processing/decoding the received frame using intended PHY receiver. The method then continues by asserting a done signal from the intended PHY receiver after the intended PHY receiver finishes processing the received frame.

The method may alternatively determine if both of the DSSS/CCK claim and the OFDM claim have been asserted. If both of the DSSS/CCK claim and the OFDM claim have been asserted, then the method employs arbitration rules and designates the DSSS/CCK PHY receiver as the intended PHY receiver.

If neither of the DSSS/CCK claim or the OFDM claim has been asserted, then the method continues by determining whether an energy has been detected that is above an energy threshold. If the detected energy of the received frame is not above the energy threshold, then the method ends. However, if the detected energy of the received frame is above the energy threshold, then the method continues by asserting an ED (Energy Detect) signal to the DSSS/CCK PHY and to the OFDM PHY. The method then does not allow for the assertion of any claims for a predetermined period of time (and/or until the energy dissipates).

Figure 25:
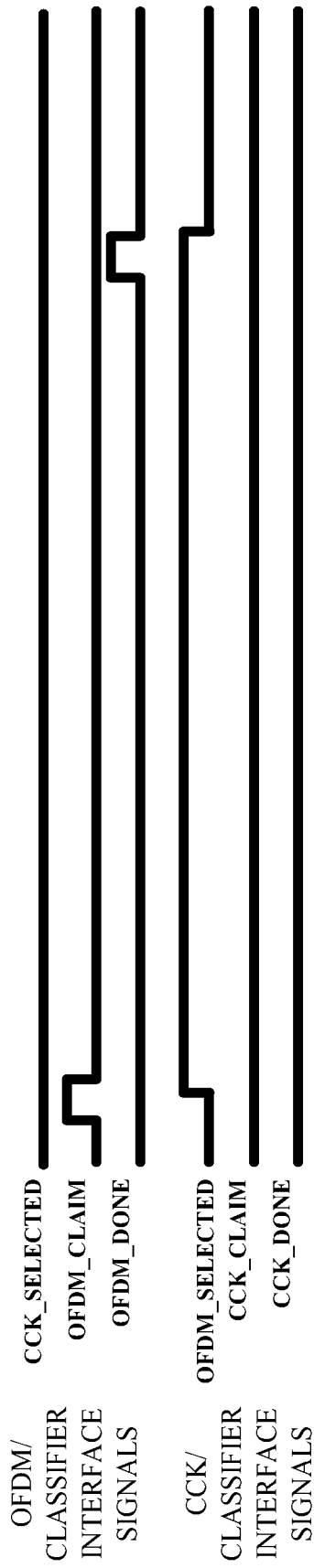
FIG. 25 is a timing diagram illustrating an embodiment of signaling within an IEEE 802.11g operable device when operating on a good OFDM frame (or packet) according to the invention.

FIG. 25 is a timing diagram illustrating an embodiment of signaling within an IEEE 802.11g operable device when operating on a good OFDM frame (or packet) according to the invention. For the various signals employed, the same definitions are employed as described above in another embodiment. This timing diagram shows the transitions of the various signals based on the assertion of an OFDM PHY for a received frame.

More specifically, within this embodiment, the OFDM correlation (e.g., a confidence level) is found to have exceeded a design threshold upon the receipt of the good OFDM frame (or packet). Therefore, the OFDM PHY asserts the OFDM_CLAIM signal to the classifier within the OFDM/classifier interface, and the DSSS/CCK PHY does not assert the DSSS/CCK_CLAIM signal to the classifier within the DSSS/CCK/classifier interface. The classifier transitions to the OFDM_SELECTED state and therefore the OFDM_SELECTED signal is shown as being asserted within the DSSS/CCK/classifier interface.

However, the DSSS/CCK correlation is found not to have exceeded its corresponding design threshold upon the receipt of the good OFDM frame (or packet). Therefore, the classifier does not transition to the DSSS/CCK_SELECTED state and therefore the DSSS/CCK_SELECTED signal is not asserted within the OFDM/classifier interface. While the classifier is in the OFDM_SELECTED state as shown within the DSSS/CCK/classifier interface, the DSSS/CCK PHY remains idle. Therefore, the classifier does not assert the DSSS/CCK_CLAIM and the DSSS/CCK_DONE signals within the DSSS/CCK/classifier interface. The classifier does not exit the OFDM_SELECTED state until it receives an OFDM_DONE signal from the OFDM PHY.

In some instances, various aspects of the invention can be found in a WLAN (Wireless Local Area Network) interactive device that includes a classifier and a plurality of PHY (physical layer) receivers. Each PHY receiver of the plurality of PHY receivers is communicatively coupled to the classifier. The device operates by receiving a frame of data. Each PHY receiver performs pre-processing of the received frame to calculate a confidence level indicating whether the received frame is intended for that particular PHY receiver. For each of the PHY receivers, when its calculated confidence level exceeds a given threshold (specific to that particular PHY receiver), that PHY receiver asserts a claim to the classifier for the received frame. The classifier is also operable to arbitrate among competing claims provided from the PHY receiver (when multiple claims are received).

In some instances, the confidence levels calculated by the PHY receivers may also be provided to the classifier (in addition to the claims). These confidence levels may be provided to the classifier for each and every received frame that is received by the WLAN interactive device. Alternatively, the confidence level may be selectively provided to the classifier only from those PHY receivers that actually assert a claim to the classifier for the received frame. When the confidence levels are provided to the classifier, then the classifier may perform an even more advanced approach of arbitrating among competing claims that includes not only considering the claims that are asserted but involves considering the corresponding confidence levels associated with those claims and/or all of the confidence levels calculated by each of the PHY receivers.

For each of the PHY receivers, when its calculated confidence level exceeds a predetermined threshold for that PHY receiver, that PHY receiver asserts a claim to the classifier. The classifier then ensures that the received frame is processed by the intended PHY receiver. The classifier asserts a PHY select signal to the intended PHY receiver that may be viewed as granting the intended PHY receiver the right to process the received frame. The intended PHY receiver processes the received frame, and the intended PHY receiver asserts a PHY done signal to the classifier after finishing processing the received frame.

In some embodiments, the classifier is communicatively coupled to a plurality of higher protocol layers. The higher protocol layers may include either one or both of a MAC (Medium Access Controller) and 1 or more higher application layers. The PHY receivers may be implemented as a number of different types of PHY receivers. For example, one PHY receiver may be implemented as a DSSS/CCK (Direct Sequence Spread Spectrum with Complementary Code Keying) PHY receiver. The DSSS/CCK PHY receiver is operable to compute a correlation and a corresponding confidence level using the received frame and a predetermined spreading sequence of a DSSS/CCK frame.

Another PHY receiver may be implemented as an OFDM (Orthogonal Frequency Division Multiplexing) PHY receiver. The OFDM PHY receiver is operable to compute a correlation and a corresponding confidence level using the received frame and a delayed copy of the received frame such that the delay between the received frame and the delayed copy of the received frame is a period of a training sequence of the received frame.

Alternatively, one of the PHY receivers may be implemented as an IEEE (Institute of Electrical & Electronics Engineers) 802.11b operable PHY receiver, and another PHY receiver may be implemented as an IEEE 802.11g operable PHY receiver. In some instances a single 802.11 operable device may be a complete 802.11a/b/g solution that may be employed within an 802.11a WLAN, an 802.11b WLAN, an 802.11g WLAN, and/or an 802.11b/g WLAN.

Gain control functionality may also be implemented to ensure that the received frame is scaled appropriately for processing within the device. A coarse type gain control may be performed during pre-processing of the received frame, and a fine type gain control may be performed (tailored specifically to the intended PHY) when the intended PHY actually processes the received frame. This gain control functionality may be supported by a functional block external to the PHY receivers. Alternatively, the gain control functionality may be supported within each of the PHY receivers. For example, when each of the PHY receivers performs the pre-processing of the received frame, then the coarse gain control supported therein is employed on the received frame. This coarse gain control may be performed in an RF front-end, and it may be controlled by 1 of the PHY receivers. Then, when the intended PHY receiver actually processes the received frame, the fine gain control supported therein is employed on the received frame. Similarly, this fine coarse gain control may be performed in the RF front-end, and it may be controlled by 1 of the PHY receivers (e.g., by the intended PHY receiver in this case).

Arbitration may be performed by the classifier when 2 or more PHY receivers assert claims to the classifier. For example, when one of the PHY receivers is a DSSS/CCK PHY receiver and another PHY receiver is an OFDM PHY receiver, and when both the DSSS/CCK PHY receiver and the OFDM PHY receiver assert a claim to the classifier, the claim asserted by the DSSS/CCK PHY receiver is given priority. This priority scheme (e.g., arbitration rule) represents just one way in which a particular design may be implemented. In other embodiments, different arbitration rules/tie-breaking rules may be employed within other designs that may include these PHY receivers and/or other PHY receivers.

Moreover, each PHY receiver of the plurality of PHY receivers may be implemented to support a false claim percentage that is less than a demodulation error rate of any of the PHY receivers. When a reduced functionality set PHY receiver asserts a claim corresponding to the received frame, then a reduced functionality set PHY receiver (which may not be capable to process the received frame) times out for a predetermined period of time. This predetermined period of time may correspond to the time period that is allotted for each of the full functionality set PHY receivers to process a received frame.

One of the PHY receivers may be implemented to include ED (Energy Detect) functionality that is operable to calculate energy that may be existent within the WLAN; this energy may correspond to a received frame type that the device is incapable to process. For example, the device does not include a PHY receiver capable to process such a received frame. This ED functionality may be implemented within an OFDM PHY receiver in some embodiments. When energy is in fact detected but the received frame is deemed as not being intended for any of the PHY receivers in the device, then an ED claim may be asserted to the classifier. In some embodiments, the received frame can be deemed as not being intended for any of the PHY receivers in the device, by the event of energy having been detected and remaining existent for a predetermined period of time, with none of the plurality of PHY receivers asserting a claim in that time. The classifier may then assert an ED select signal to each PHY receiver of the plurality of PHY receivers. In addition, the classifier may wait a predetermined period of time before accepting a subsequent claim that is asserted by any PHY receiver of the plurality of PHY receivers. Alternatively, the classifier may wait until the energy dissipates (as determined by ongoing monitoring of the energy) before accepting a subsequent claim that is asserted by any PHY receiver of the plurality of PHY receivers; this may be implemented by the classifier receiving an ED done signal. This may be achieved by an ED operable PHY receiver asserting a done signal to the classifier after a predetermined period of time has passed Alternatively, the classifier may assert an ED select signal to each PHY receiver of the plurality of PHY receivers upon the condition of only the energy of the received frame being above an energy threshold. Also, the classifier may wait a predetermined period of time before accepting a subsequent claim that is asserted by any PHY receiver of the plurality of PHY receivers upon this sole condition as well. Alternatively, the classifier may wait until the energy dissipates (as determined by ongoing monitoring of the energy) before accepting a subsequent claim that is asserted by any PHY receiver of the plurality of PHY receivers; this may be implemented by the classifier receiving an ED done signal.

The device may be implemented in a number of ways including implementing the classifier and the plurality of PHY receivers within a single integrated circuit. Alternatively, the classifier and the plurality of PHY receivers may be implemented within different integrated circuits and/or functional blocks within the device without departing from the scope and spirit of the invention. Also, the WLAN interactive device may be specifically implemented in one embodiment also as being an IEEE (Institute of Electrical & Electronics Engineers) 802.11g operable device.

In view of the above detailed description of the invention and associated drawings, other modifications and variations will now become apparent. It should also be apparent that such other modifications and variations may be effected without departing from the spirit and scope of the invention.

What is claimed is:

1. An apparatus, comprising:
a plurality of PHY (physical layer) receivers for pre-processing a frame;
a classifier for identifying an intended PHY receiver, from the plurality of PHY receivers, for processing the frame; and
a gain control block for scaling the frame using a first gain, corresponding to a range being appropriate for a majority of the PHY receivers, when the plurality of PHY receivers pre-processing the frame; and wherein:
the gain control block scaling the frame using a second gain when the intended PHY receiver processing the frame.

2. The apparatus of claim 1, wherein:
the second gain corresponding to a range being appropriate for the intended PHY receiver.

3. The apparatus of claim 1, wherein:
each of the plurality of PHY receivers pre-processing the frame for calculating a confidence level indicating whether the frame being intended for that PHY receiver;
each of the plurality of PHY receivers calculating a respective confidence level being equal to or exceeding a threshold corresponding to that PHY receiver asserting a respective claim to the classifier;

when 2 or more of the plurality of PHY receivers asserting claims to the classifier, the classifier arbitrating the claims and designating 1 of the 2 or more of the plurality of PHY receivers as being the intended PHY receiver;
when only 1 of the plurality of PHY receivers asserting a claim to the classifier, the classifier designating that 1 PHY receiver as being the intended PHY receiver;
the classifier asserting a PHY select signal to the intended PHY receiver;
the intended PHY receiver processing the frame; and
the intended PHY receiver asserting a PHY done signal to the classifier after the intended PHY receiver finishes processing the frame.

4. The apparatus of claim 3, wherein:
a first of the plurality of PHY receivers being a DSSS/CCK (Direct Sequence Spread Spectrum with Complementary Code Keying) PHY receiver;
a second of the plurality of PHY receivers being an OFDM (Orthogonal Frequency Division Multiplexing) PHY receiver; and
when both the DSSS/CCK PHY receiver and the OFDM PHY receiver asserting a claim to the classifier, the claim asserted by the DSSS/CCK PHY receiver being given priority and the DSSS/CCK PHY receiver being designated as the intended PHY receiver.

5. The apparatus of claim 1, wherein:
the classifier being communicatively coupled to a plurality of higher protocol layers; and
one of the plurality of higher protocol layers being a MAC (Medium Access Controller) or a higher application layer.

6. The apparatus of claim 1, wherein:
one of the plurality of PHY receivers being a DSSS/CCK (Direct Sequence Spread Spectrum with Complementary Code Keying) PHY receiver for computing a correlation using the frame and a predetermined spreading sequence of a DSSS/CCK frame.

7. The apparatus of claim 1, wherein:
one of the plurality of PHY receivers being an OFDM (Orthogonal Frequency Division Multiplexing) PHY receiver for computing a correlation using the frame and a delayed copy of the frame; and
the delay between the frame and the delayed copy of the frame is a period of a training sequence of the frame.

8. The apparatus of claim 1, wherein:
the classifier, the plurality of PHY receivers, and the gain control block being implemented within a single integrated circuit within the apparatus.

9. The apparatus of claim 1, wherein:
one of the plurality of PHY receivers being an OFDM (Orthogonal Frequency Division Multiplexing) PHY receiver; and
the OFDM PHY receiver including ED (Energy Detect) functionality for calculating an energy of the frame 10. The apparatus of claim 1, wherein:
the apparatus being at least one of a personal computer, a laptop computer, a mobile unit, and a WLAN (Wireless Local Area Network) interactive device.

11. An apparatus, comprising:
a plurality of PHY (physical layer) receivers for pre-processing a frame;
a classifier for identifying an intended PHY receiver, from the plurality of PHY receivers, for processing the frame; and
a gain control block for scaling the frame using a first gain, corresponding to a range being appropriate for a majority of the PHY receivers, when the plurality of PHY receivers pre-processing the frame; and wherein:

the gain control block scaling the frame using a second gain, corresponding to a range being appropriate for the intended PHY receiver, when the intended PHY receiver processing the frame;

a first of the plurality of PHY receivers being a DSSS/CCK (Direct Sequence Spread Spectrum with Complementary Code Keying) PHY receiver for computing a correlation using the frame and a predetermined spreading sequence of a DSSS/CCK frame; and a second of the plurality of PHY receivers being an OFDM (Orthogonal Frequency Division Multiplexing) PHY receiver for computing a correlation using the frame and a delayed copy of the frame such that the delay between the frame and the delayed copy of the frame is a period of a training sequence of the frame.

12. The apparatus of claim 11, wherein:

each of the plurality of PHY receivers pre-processing the frame for calculating a confidence level indicating whether the frame being intended for that PHY receiver;

each of the plurality of PHY receivers calculating a respective confidence level being equal to or exceeding a threshold corresponding to that PHY receiver asserting a respective claim to the classifier;

when 2 or more of the plurality of PHY receivers asserting claims to the classifier, the classifier arbitrating the claims and designating 1 of the 2 or more of the plurality of PHY receivers as being the intended PHY receiver;

when only 1 of the plurality of PHY receivers asserting a claim to the classifier, the classifier designating that 1 PHY receiver as being the intended PHY receiver;

the classifier asserting a PHY select signal to the intended PHY receiver;

the intended PHY receiver processing the frame; and the intended PHY receiver asserting a PHY done signal to the classifier after the intended PHY receiver finishes processing the frame.

13. The apparatus of claim 12, wherein:

a first of the plurality of PHY receivers being a DSSS/CCK (Direct Sequence Spread Spectrum with Complementary Code Keying) PHY receiver;

a second of the plurality of PHY receivers being an OFDM (Orthogonal Frequency Division Multiplexing) PHY receiver; and when both the DSSS/CCK PHY receiver and the OFDM PHY receiver asserting a claim to the classifier, the claim asserted by the DSSS/CCK PHY receiver being given priority and the DSSS/CCK PHY receiver being designated as the intended PHY receiver.

14. The apparatus of claim 11, wherein:

the classifier, the plurality of PHY receivers, and the gain control block being implemented within a single integrated circuit within the apparatus.

15. The apparatus of claim 11, wherein:

the apparatus being at least one of a personal computer, a laptop computer, a mobile unit, and a WLAN (Wireless Local Area Network) interactive device.

16. A method for operating a communication device, the method comprising:

operating a plurality of PHY (physical layer) receivers for pre-processing a frame;

operating a classifier for identifying an intended PHY receiver, from the plurality of PHY receivers, for processing the frame;

scaling the frame using a first gain, corresponding to a range being appropriate for a majority of the PHY receivers, when operating the plurality of PHY receivers for pre-processing the frame; and scaling the frame using a second gain when operating the intended PHY receiver for processing the frame.

17. The method of claim 16, wherein:

the second gain corresponding to a range being appropriate for the intended PHY receiver.

18. The method of claim 16, further comprising:

operating each of the plurality of PHY receivers pre-processing the frame for calculating a confidence level indicating whether the frame being intended for that PHY receiver;

from each of the plurality of PHY receivers calculating a respective confidence level being equal to or exceeding a threshold corresponding to that PHY receiver, asserting a respective claim to the classifier;

when 2 or more of the plurality of PHY receivers asserting claims to the classifier, operating the classifier for arbitrating the claims and designating 1 of the 2 or more of the plurality of PHY receivers as being the intended PHY receiver;

when only 1 of the plurality of PHY receivers asserting a claim to the classifier, operating the classifier for designating that 1 PHY receiver as being the intended PHY receiver;

operating the classifier for asserting a PHY select signal to the intended PHY receiver;

operating the intended PHY receiver for processing the frame; and operating the intended PHY receiver for asserting a PHY done signal to the classifier after the intended PHY receiver finishes processing the frame.

19. The method of claim 16, wherein:

a first of the plurality of PHY receivers being a DSSS/CCK (Direct Sequence Spread Spectrum with Complementary Code Keying) PHY receiver; and a second of the plurality of PHY receivers being an OFDM (Orthogonal Frequency Division Multiplexing) PHY receiver; and further comprising:

when both the DSSS/CCK PHY receiver and the OFDM PHY receiver asserting a claim to the classifier, giving priority to the claim asserted by the DSSS/CCK PHY and the designating the DSSS/CCK PHY receiver as the intended PHY receiver.

20. The method of claim 16, wherein:

the communication device being at least one of a personal computer, a laptop computer, a mobile unit, and a WLAN (Wireless Local Area Network) interactive device.

* * * * *